United States Patent
Kim et al.

(10) Patent No.: US 11,398,963 B2
(45) Date of Patent: Jul. 26, 2022

(54) DISPLAY DEVICE AND OPERATING METHOD THEREOF

(71) Applicant: SAMSUNG ELECTRONICS CO., LTD., Suwon-si (KR)

(72) Inventors: Jinho Kim, Suwon-si (KR); Deoknam Kim, Suwon-si (KR); Sukun Yoon, Suwon-si (KR); Cheulhee Hahm, Suwon-si (KR); Joohyoun Park, Suwon-si (KR); Sangu Shim, Suwon-si (KR); Jaehwan Sim, Suwon-si (KR); Geunyoung Yu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 25 days.

(21) Appl. No.: 16/913,603

(22) Filed: Jun. 26, 2020

(65) Prior Publication Data
US 2020/0412629 A1    Dec. 31, 2020

(30) Foreign Application Priority Data

Jun. 28, 2019 (KR) .......................... 10-2019-0078276

(51) Int. Cl.
*H04L 43/0811* (2022.01)
*G16Y 40/10* (2020.01)
(Continued)

(52) U.S. Cl.
CPC .......... *H04L 43/0811* (2013.01); *G09G 5/003* (2013.01); *G16Y 40/10* (2020.01); *H04L 43/106* (2013.01); *G09G 2370/02* (2013.01)

(58) Field of Classification Search
CPC . H04L 43/0811; H04L 43/106; H04L 67/145; H04L 67/12; H04L 69/161;
(Continued)

(56) References Cited

U.S. PATENT DOCUMENTS 9,036,616 B2    5/2015  Sundararajan et al.
9,277,500 B1    3/2016  Solsona-Palomar et al.
(Continued)

FOREIGN PATENT DOCUMENTS

KR    1020120076859 A    7/2012
KR    10-2015-0109465 A   10/2015
WO    2017176241 A1       10/2017

OTHER PUBLICATIONS

International Search Report (PCT/ISA/210) and Written Opinion (PCT/ISA/237) dated Sep. 21, 2020 issued by the International Searching Authority in International Application No. PCT/KR2020/008340.
(Continued)

*Primary Examiner* — Walter J Divito
(74) *Attorney, Agent, or Firm* — Sughrue Mion, PLLC

(57) ABSTRACT

A display device and a method of operating the same are provided. The display device includes: a display; a communicator configured to perform communication with a server via a wireless network; and a processor configured to execute at least one instruction to: receive a first packet from the server by communicating with the server to perform a first keep-alive operation according to a first communication protocol, generate and transmit, to the communicator, a second packet for performing a second keep-alive operation according to a second communication protocol with the server, based on data included in the received first packet, and control the display device to enter a suspend mode after transmitting the second packet, wherein the communicator is further configured to, while the display device is in the suspend mode, perform the second keep-alive operation by transmitting the second packet to the server at intervals of a first period.

22 Claims, 17 Drawing Sheets

(51) Int. Cl.
   *G09G 5/00*   (2006.01)
   *H04L 43/106*   (2022.01)
(58) Field of Classification Search
   CPC ..... H04L 67/10; H04L 1/1607; H04L 1/0006;
      H04L 69/18; H04L 67/142; H04L 69/16;
      H04L 69/22; H04L 61/256; G16Y 40/10;
      G09G 5/003; G09G 2370/02; Y02D
      10/00; Y02D 30/70; G06F 1/3265; G06F
      1/3287; H04W 52/028; H04W 76/25;
      G08C 17/02
   See application file for complete search history.

(56) References Cited

U.S. PATENT DOCUMENTS

| | | | |
|---|---|---|---|
| 2007/0058599 A1 | 3/2007 | Harsch | |
| 2007/0140159 A1 | 6/2007 | Eronen et al. | |
| 2007/0183445 A1* | 8/2007 | Kim | H04W 8/005 |
| | | | 370/461 |
| 2007/0218899 A1* | 9/2007 | Kim | H04W 52/0225 |
| | | | 455/434 |
| 2009/0034430 A1* | 2/2009 | Popoviciu | H04W 12/03 |
| | | | 370/254 |
| 2012/0117401 A1 | 5/2012 | Gobriel et al. | |
| 2012/0170496 A1 | 7/2012 | Yang et al. | |
| 2012/0233478 A1* | 9/2012 | Mucignat | H04W 52/0277 |
| | | | 713/320 |
| 2013/0067060 A1 | 3/2013 | Thaler et al. | |
| 2014/0254409 A1 | 9/2014 | Tsai et al. | |
| 2016/0191509 A1* | 6/2016 | Bestler | G06F 12/1408 |
| | | | 713/163 |
| 2019/0222652 A1* | 7/2019 | Graefe | H04W 4/40 |
| 2019/0297019 A1* | 9/2019 | Mudireddy | H04L 47/6275 |
| 2020/0304589 A1* | 9/2020 | Isberg | H04L 67/2842 |

OTHER PUBLICATIONS

Communication dated Nov. 16, 2020 issued by the European Patent Office in European Application No. 20182331.7.
Communication dated May 30, 2022, issued by the India Intellectual Property Office in Indian Patent Application No. 202247002551.

* cited by examiner

DISPLAY DEVICE AND OPERATING METHOD THEREOF

CROSS-REFERENCE TO RELATED APPLICATION(S)

This application is based on and claims priority under 35 U.S.C. § 119 to Korean Patent Application No. 10-2019-0078276, filed on Jun. 28, 2019, in the Korean Intellectual Property Office, the disclosure of which is incorporated by reference herein in its entirety.

BACKGROUND

1. Field

The disclosure relates to a display device and an operating method thereof. In particular, the disclosure relates to a display device capable of implementing an Internet of things (IoT) environment, and an operating method of the display device.

2. Description of Related Art

As mobile devices are widely used, technologies, in which a mobile device and another electronic device are connected to each other via a wireless communication network and a plurality of connected electronic devices are interlocked with each other to be used, are being developed. Here, examples of the mobile device may include all electronic devices that are portable to a user.

Further, a plurality of electronic devices that are not portable are configured to be controllable by a technology such as an Internet of Things (IoT) platform, thereby developing technologies for connecting and using and/or controlling the plurality of electronic devices.

In detail, the IoT means that all things (that is, electronic devices) such as a display device (e.g., a television (TV), a smart phone, a personal computer (PC), etc.), a vehicle, an appliance (e.g., a refrigerator, a washing machine, etc.), and a wearable device (e.g., a watch, etc.) are connected to a wireless network. It is possible for a plurality of electronic devices to exchange data, process data, and be automatically driven by using the IoT. For example, a user may adjust a TV located in a house by using a smart phone outside the house.

To implement an IoT environment, a plurality of electronic devices, for example, a smart phone of a user and a TV located inside a house of the user, need to always maintain a communicable state. In this regard, the TV and the smart phone continuously consume power to maintain a communication capability at all times.

At this time, a power consumption issue may occur in the plurality of electronic devices implementing the IoT technology. Thus, an electronic device enabling the IoT environment to be implemented with low power needs to be provided.

SUMMARY

Provided are a display device capable of reducing power consumption, and an operating method of the display device.

In particular, provided are a display device capable of reducing power consumption occurring while maintaining an Internet of Things (IoT) environment in an active state, and an operating method of the display device. More particularly, provided are a display device capable of reducing power consumption occurring in response to a keep-alive operation performed to maintain an IoT environment in an active state, and an operating method of the display device.

Additional aspects will be set forth in part in the description which follows and, in part, will be apparent from the description, or may be learned by practice of the presented embodiments.

In accordance with an aspect of the disclosure, a display device includes: a display; a communicator configured to perform communication with a server via at least one wireless network; and a processor configured to execute at least one instruction to: receive a first packet from the server by communicating with the server to perform a first keep-alive operation according to a first communication protocol, generate and transmit, to the communicator, a second packet for performing a second keep-alive operation according to a second communication protocol with the server, based on data included in the received first packet, and control the display device to enter a suspend mode after transmitting the second packet, wherein the communicator is further configured to, while the display device is in the suspend mode, perform the second keep-alive operation by transmitting the second packet to the server at intervals of a first period.

The processor may be further configured to execute the at least one instruction to: update transmission control protocol (TCP) session information, based on the data included in the first packet; and generate the second packet, based on the updated TCP session information, in response to an input or an event to enter the suspend mode being received or determined.

The processor may be further configured to execute the at least one instruction to generate a TCP keep-alive packet that is the second packet of a fixed size not including payload data, based on the updated TCP session information.

The processor may be further configured to execute the at least one instruction to transmit, to the server, an open connectivity foundation (OCF) keep-alive packet according to an OCF communication protocol, and perform the first keep-alive operation based on receiving a response packet corresponding to the OCF keep-alive packet from the server.

The first communication protocol may be an OCF communication protocol and the second communication protocol may be a transmission control protocol/Internet protocol (TCP/IP) communication protocol, the server may be an Internet of Things (IoT) cloud server including an OCF cloud server, the first keep-alive operation may be an OCF keep-alive operation, and the second keep-alive operation may be a TCP keep-alive operation.

The communicator may be further configured to perform a TCP keep-alive operation that is the second keep-alive operation at the intervals of the first period; and the processor may be further configured to execute the at least one instruction to perform an OCF keep-alive operation that is the first keep-alive operation by being woken up every second period greater than the first period.

The communicator may be further configured to transmit a TCP keep-alive packet that is the second packet to a TCP/IP kernel included in the server while the display device is in the suspend mode, and perform a TCP keep-alive operation that is the second keep-alive operation based on receiving a TCP acknowledgement (ACK) packet indicating that the TCP keep-alive packet is normally received from the TCP/IP kernel.

The communicator may be further configured to determine whether to wake up the processor, based on a length of the received TCP ACK packet.

The communicator may be further configured to wake up the processor based on payload data being included in the TCP ACK packet, determining according to the length of the received TCP ACK packet, and to not wake up the processor based on the payload data not being included in the TCP ACK packet.

The display device may further include a microcomputer configured to wake up the processor every second period by storing timing information about the second period in which the first keep-alive operation is performed.

The processor may be further configured to execute the at least one instruction to enter the suspend mode after performing the OCF keep-alive operation at a first time point, receive a new first packet from the server by re-performing the OCF keep-alive operation by being woken up by the microcomputer, at a second time point after the second period is elapsed from the first time point, and generate a new second packet, based on data included in the new first packet.

The second packet may be a TCP keep-alive packet having a size of 40 bytes and including an Internet protocol (IP) header of a size of 20 bytes and a TCP header of a size of 20 bytes.

The processor may be further configured to execute the at least one instruction to set a value of the first period, based on a lifetime corresponding to the display device, which is included in a network address translation (NAT) binding table of an access point (AP) accessed to connect to the server.

The processor may be further configured to execute the at least one instruction to set a time value of the first period by repeatedly performing an operation of transmitting, to the server, an NAT check request message including an NAT check time value and receiving an NAT check response message in response to a search for the lifetime.

The data may be application data generated based on an open connectivity foundation (OCF) communication protocol.

In accordance with another aspect of the disclosure, an operating method of a display device including a display, a communicator configured to perform communication with a server via at least one wireless network, and a processor configured to execute at least one instruction, includes: receiving, by the processor, a first packet from the server by communicating with the server to perform a first keep-alive operation according to a first communication protocol; generating and transmitting, by the processor to the communicator, a second packet for performing a second keep-alive operation according to a second communication protocol with the server, based on data included in the received first packet; controlling the display device to enter a suspend mode after the transmitting of the second packet; and while the display device is in the suspend mode, performing, by the communicator, the second keep-alive operation by transmitting the second packet to the server at intervals of a first period.

The generating and transmitting may include: updating transmission control protocol (TCP) session information, based on the data included in the first packet; and generating the second packet, based on the updated TCP session information, based on a command requesting to enter the suspend mode being received.

The receiving may include transmitting, to the server, an open connectivity foundation (OCF) keep-alive packet according to an OCF communication protocol and performing the first keep-alive operation based on receiving a response packet corresponding to the OCF keep-alive packet from the server.

The first communication protocol may be an OCF communication protocol and the second communication protocol may be a transmission control protocol/Internet protocol (TCP/IP) communication protocol; the server may be an Internet of Things (IoT) cloud server including an OCF cloud server; and the first keep-alive operation may be an OCF keep-alive operation and the second keep-alive operation may be a TCP keep-alive operation.

The performing of the first keep-alive operation may include performing an OCF keep-alive operation that is the first keep-alive operation by being woken up every second period greater than the first period.

The second packet may be a TCP keep-alive packet of a fixed size not including payload data.

In accordance with another aspect of the disclosure, a non-transitory computer-readable recording medium has recorded thereon at least one instruction executable by a processor of an electronic device to perform a method including: receiving, by the processor, a first packet from a server by communicating with the server to perform a first keep-alive operation according to a first communication protocol; generating and transmitting, by the processor to a communicator of the electronic device, a second packet for performing a second keep-alive operation according to a second communication protocol with the server, based on data included in the received first packet; controlling the electronic device to enter a suspend mode after the transmitting of the second packet; and while the electronic device is in the suspend mode, performing, by the communicator, the second keep-alive operation by transmitting the second packet to the server at intervals of a first period.

In accordance with another aspect of the disclosure, an electronic device includes: a communicator configured to perform communication with a server via at least one wireless network; and a processor configured to execute at least one instruction to: receive a first packet from the server by communicating with the server to perform a first keep-alive operation according to a first communication protocol, generate and transmit, to the communicator, a second packet for performing a second keep-alive operation according to a second communication protocol with the server, based on data included in the received first packet, and control the electronic device to enter a suspend mode after transmitting the second packet, wherein the communicator is further configured to, while the electronic device is in the suspend mode, perform the second keep-alive operation by transmitting the second packet to the server at intervals of a first period.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
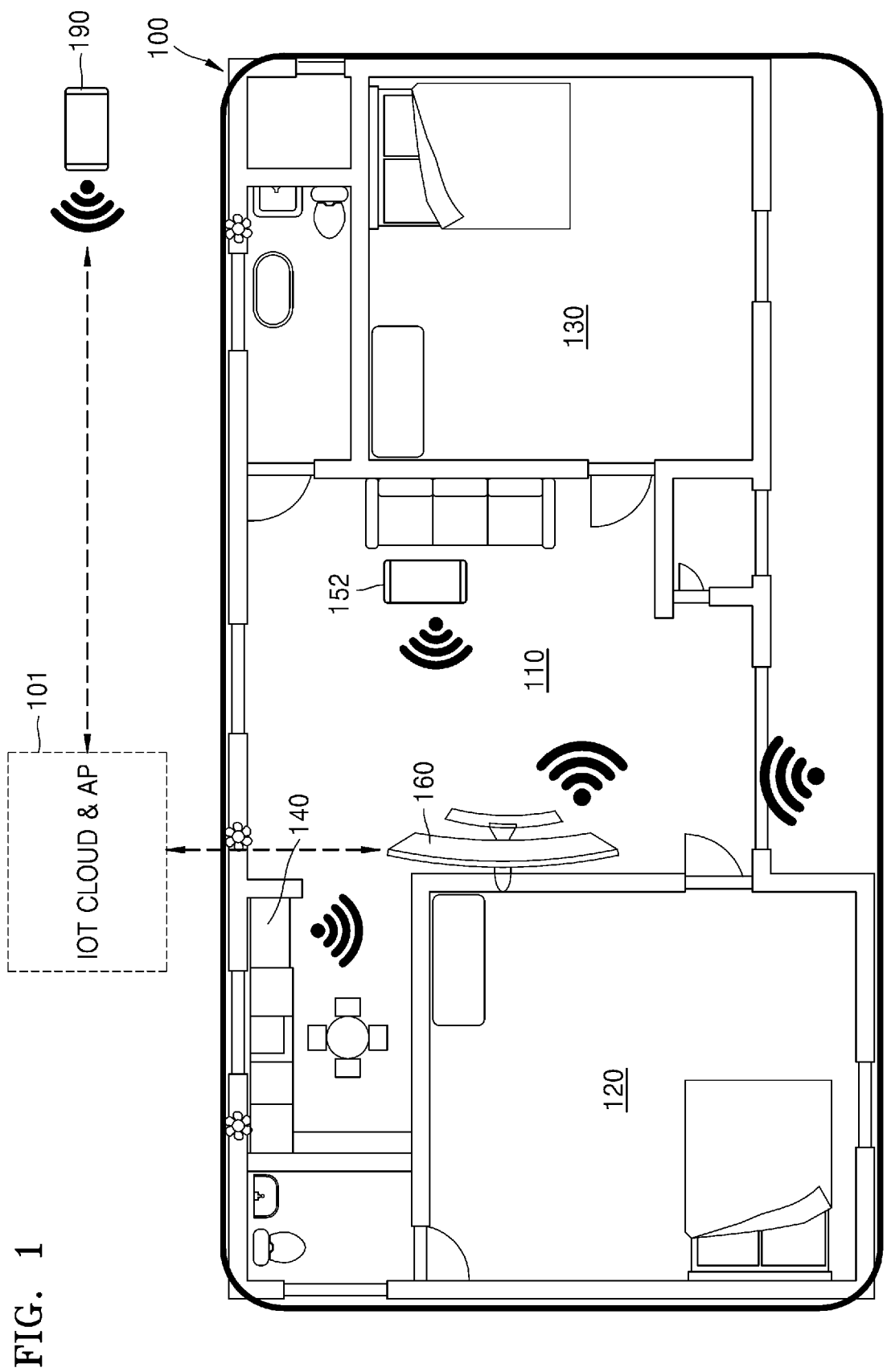
FIG. 1 is a diagram for describing an Internet of Things (IoT) technology.

Hereinafter, embodiments of the disclosure will be described in detail with reference to the accompanying drawings such that one of ordinary skill in the art may easily implement the disclosure. However, embodiments may be implemented in various different forms and is not limited to the embodiments exemplarily described herein. Also, in the drawings, like reference numerals designate like elements throughout the specification.

Throughout the specification, when a part is "connected" to another part, the part may not only be "directly connected" to the other part, but may also be "electrically connected" to the other part with another element in between. In addition, when a part "includes" a certain component, the part may further include another component instead of excluding the other component, unless otherwise stated.

The phrases "some embodiments" or "an embodiment" appearing in various places in this specification are not necessarily all referring to the same embodiment of the disclosure.

Some embodiments of the disclosure may be represented by functional block configurations and various processing operations. Some or all of these functional blocks may be implemented by various numbers of hardware and/or software configurations that perform particular functions. For example, the functional blocks of the disclosure may be implemented by one or more processors or microprocessors or by circuit configurations for performing an intended function. Also, for example, the functional blocks of the disclosure may be implemented in various programming or scripting languages. The functional blocks may be implemented by algorithms executed in one or more processors. In addition, the disclosure may employ related art techniques for electronic environment setting, signal processing, and/or data processing. Terms such as modules and configurations may be widely used and are not limited to mechanical and physical configurations.

In addition, a connection line or a connection member between components shown in drawings is merely a functional connection and/or a physical or circuit connection. In an actual device, connections between components may be represented by various functional connections, physical connections, or circuit connections that are replaceable or added.

Throughout the disclosure, expressions such as "at least one of a, b [and/or] c" indicates only a, only b, only c, both a and b, both a and c, both b and c, all of a, b, and c, or variations thereof.

An electronic device according to an embodiment may be any electronic device connectable to another electronic device via a wireless communication network. In particular, the electronic device according to an embodiment may be any electronic device capable of implementing an Internet of Things (IoT) environment by being connected to at least one another electronic device via a wireless communication network.

An electronic device according to an embodiment may be implemented in various forms such as a mobile phone, a tablet personal computer (PC), a digital camera, a camcorder, a laptop computer, a desktop computer, an electronic book terminal, a digital broadcasting terminal, a personal digital assistant (PDA), a portable multimedia player (PMP), a navigation device, an MP3 player, and a wearable device. Also, an electronic device according to an embodiment may be a household appliance such as a refrigerator or an air purifier. An electronic device may be a fixed electronic device arranged at a fixed location or a mobile electronic device in a portable form, and may be a digital broadcast receiver capable of receiving a digital broadcast.

Hereinafter, an electronic device according to an embodiment will be described and illustrated as an example of a display device that includes a display to visually output image data.

Also, a method according to an embodiment may be an operating method of an electronic device. Hereinafter, a description will be provided of an operating method of a display device, according to an embodiment.

FIG. 1 is a diagram for describing an IoT technology.

To implement IoT, a display device according to an embodiment may transmit or receive certain data to or from at least one adjacent electronic device, be paired with at least one adjacent electronic device, remotely control at least one adjacent electronic device, or be controlled by at least one adjacent electronic device, via a communication network. Here, the communication network may be configured by at least one of a wired communication network or a wireless communication network. In particular, the communication network used to implement IoT may include mobile communication (for example, wireless broadband (Wibro), world interoperability for microwave access (Wimax), code division multiple access (CDMA), wideband CDMA (WCDMA), 3rd generation (3G), 4G, or 5G), short distance communication (near field communication (NFC), Bluetooth, or wireless local area network (WLAN) (Wi-Fi)), and/or low power wide area communication (TV white space (TVWS) or weightless).

Hereinafter, an example in which a display device is interconnected with another electronic device (for example, a mobile device) located at a long distance via a network using a transmission control protocol/Internet protocol (TCP/IP) communication protocol that is an Internet protocol to implement an IoT environment is described. In other words, one or more embodiments will be described with examples in which an IoT platform is implemented by using a TCP/IP communication protocol that is an Internet protocol.

In particular, an IoT environment may be implemented when at least one electronic device (for example, a display device 160) located inside a house 100 and an electronic device (for example, a portable device 190) located at a long distance from the house 100 are connected via an Internet network.

Referring to FIG. 1, electronic devices located inside the house 100 may include a refrigerator 140, the display device 160, and a mobile device 152 of a user.

Also, spaces inside the house 100 may be divided into bedrooms 120 and 130 and a kitchen and living room 110. The display device 160 may be arranged in the living room 110. By way of example, the display device 160 may be a curved display attached on a wall surface.

A family member may be a user of the display device 160. The user may possess the portable device 190. When the user carrying the portable device 190 is located at a long distance from the house 100, the portable device 190 and the display device 160 may be connected via a wireless communication network. Here, the portable device 190 may be a mobile computing device, such as a wearable device, a smart phone, a tablet PC, a personal digital assistant (PDA), a laptop computer, a media player, a micro-server, a global positioning system (GPS) device, etc.

In particular, the portable device 190 and the display device 160 may be connected to each other via a home IoT platform. The display device 160 and the portable device 190 may be interconnected via a wireless communication network such as an Internet network. For example, the display device 160 and the portable device 190 may be connected to each other via an IoT cloud and access point (AP) 101 forming an IoT platform.

Here, an "IoT cloud" denotes a server, cloud server, or cloud server device that is interconnected to a plurality of electronic devices located at a long distance so as to support an IoT platform. According to an embodiment, an IoT cloud server denotes any server or device supporting an IoT platform. Also, a "server" as described herein according to an embodiment may indicate an IoT cloud server that is a server supporting an IoT platform.

An "AP" performs a function of a base station in WLAN and may connect a wired network and a wireless network. In particular, the AP may function as a bridge connecting a WLAN to which the display device 160 is connected and a mobile communication network connected to an IoT cloud server.

According to an embodiment, the display device 160 may operate according to control of the portable device 190 and may perform an automatically requested operation according to control of the portable device 190.

As described above, the user may be located at a long distance from the house 100. At this time, the user may want a program recording operation to be performed by turning on the display device 160 located inside the house 100 by using the portable device 190 carried by the user. In this case, the portable device 190 may transmit, to the display device 160, a signal requesting the display device 160 to be turned on, in response to a user input.

The IoT cloud and AP 101 may transmit the signal received from the portable device 190 to the display device 160. Such a transmitting operation is described in detail below with reference to FIG. 2. Also, hereinafter, an electronic device located at a long distance from the display device 160 is referred to as an external device. In other words, hereinafter, the portable device 190 of FIG. 1 is illustrated and referred to as an "external device 190."

Figure 2:
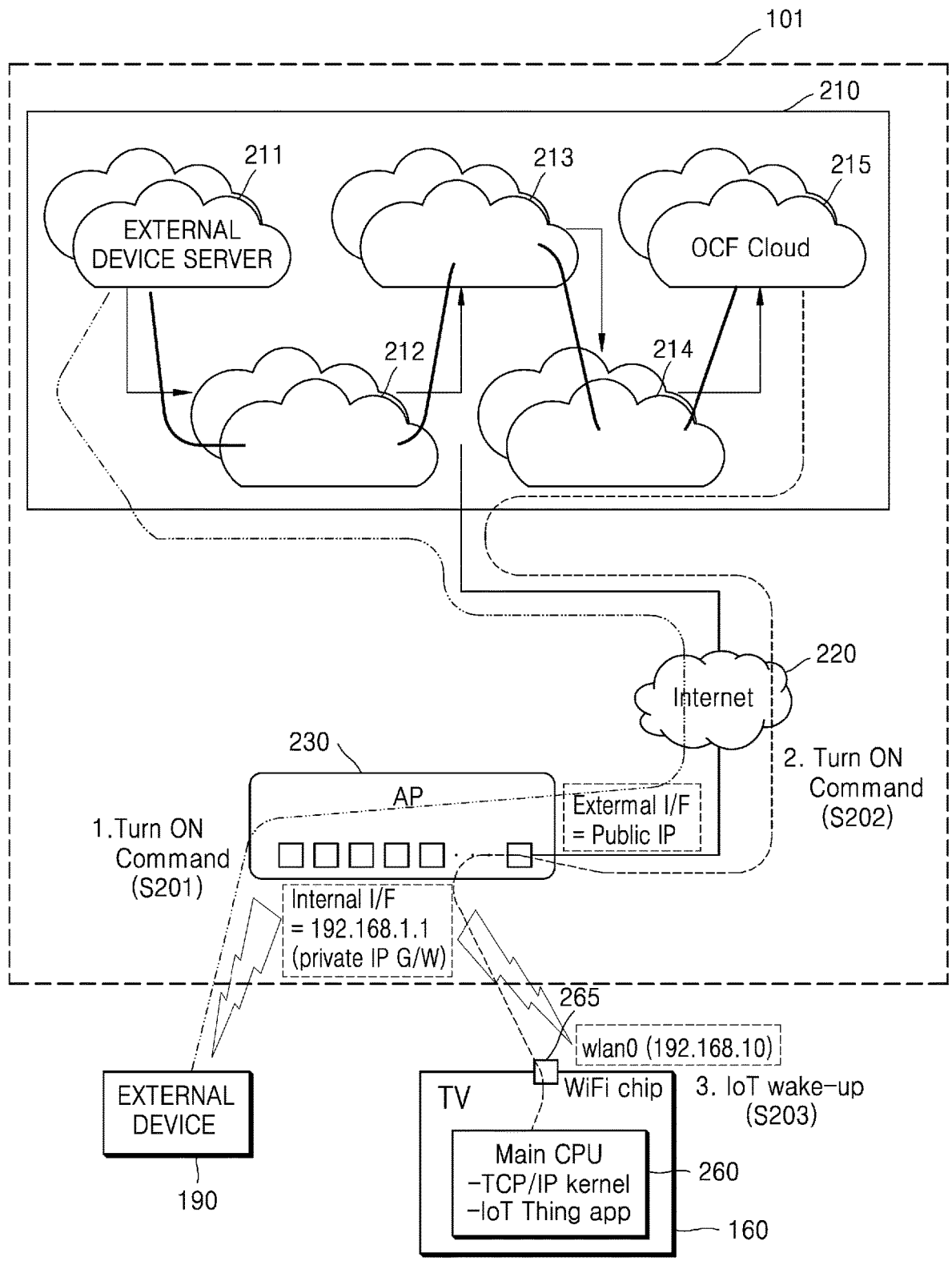
FIG. 2 is a diagram for describing a display device and an external device operating in an IoT environment.

FIG. 2 is a diagram for describing the display device 160 and the external device 190 operating in an IoT environment. In FIG. 2, the same components as in FIG. 1 are illustrated using the same reference numerals.

Referring to FIG. 2, the IoT cloud and AP 101 of FIG. 1 may include an IoT cloud server 210 and an AP 230.

Also, the IoT cloud server 210 may include at least one server supporting a communication connection to form an IoT platform. In particular, the IoT cloud server 210 may include at least one server supporting communication according to an IoT-related standard (for example, open connectivity foundation (OCF)) for forming an IoT platform.

For example, the IoT cloud server 210 may include an external device server 211 and an OCF server 215, which are servers for supporting an application performable in the external device 190. Here, the OCF server 215 may also be referred to as an OCF cloud server. Also, the IoT cloud server 210 may further include at least one cloud server 212, 213, and 214. The at least one cloud server 212, 213, and 214 may be a server for connecting the external device server 211 and the OCF server 215.

Here, a "server" is a computing device operating to provide a platform or service according to IoT by supporting a communication connection between a plurality of electronic devices via a network, and may be implemented as software and/or hardware. According to an embodiment, the server is described and illustrated herein as a cloud server implemented via a cloud.

The AP 230 may function as a bridge connecting a WLAN to which the display device 160 is connected and a mobile communication network connected to the IoT cloud server 210. Also, in FIG. 2, to implement the IoT platform, an example in which the Internet 220 that is a network using a TCP/IP communication protocol that is an Internet protocol is used will be illustrated and described.

The display device 160 may include a processor 260. The processor 260 may be configured as a main central processing unit (CPU). The processor 260 may control overall operations of the display device 160. In particular, the processor 260 may control operations of the display device 160 after the display device 160 is woken up.

Also, the processor 260 may include an IoT application (indicated as "IoT Thing app" in FIG. 2) and a TCP/IP kernel (indicated as "TCP/IP kernel" in FIG. 2). Here, the IoT application is an application enabling the IoT platform to be implemented and may control operations performed via the IoT platform. The TCP/IP kernel controls and takes charge of transmission and reception of data based on a TCP/IP communication protocol that is an Internet protocol. Hereinafter, for convenience of description, the TCP/IP communication protocol is simply referred to as a TCP/IP protocol.

An operation of remotely turning on the display device 160 by using the IoT platform after the display device 160 is turned off and enters a suspend mode will now be described.

Here, turning off may denote an operation of turning off the display device 160 that is reproducing image data, by using a remote control device. In response to the display device 160 being turned off, a display screen of the display device 160 is switched to a black screen. Also, turning on may denote an operation of switching the display device 160 that is in a black screen state to a state capable of reproducing image data. "Turn off" and "turn on" may be respectively referred to as "power off" and "power on."

An operation mode of the display device 160 may largely include a normal mode and a suspend mode. In particular, the normal mode and the suspend mode may be distinguished based on whether power is supplied to at least one component other than a communicator 265. The normal mode may denote an operation state in which power is supplied to the communicator 265 of the display device 160 and at least one component. The suspend mode may denote an operation state in which power is supplied only to the communicator 265.

When the communicator 265 does not perform a timer operation, i.e., when a component (for example, a microcomputer 550 of FIG. 5 described below) other than the communicator 265 performs a timer operation, the suspend mode may denote an operation state in which power is supplied only to the communicator 265 and the component (for example, the microcomputer 550) performing the timer operation.

Also, a mode in which power is supplied to the communicator 265 and the processor 260 woken up by the communicator 265 is referred to as a low power mode (LPM). When the operation mode of the display device 160 is largely distinguished as the normal mode and the suspend mode, the LPM may be included in the suspend mode. Also, when the operation mode is largely distinguished as the normal mode and the suspend mode in terms of the processor 260, because power is supplied to the processor 260 in the LPM, the LPM may be included in the normal mode in terms of the processor 260. Also, an operation mode in which power is supplied to the processor 260 woken up by the communicator 265 and power is not supplied to a component other than the processor 260 will be separately referred to as a LPM. In particular, the LPM may indicate a state in which the communicator 265 wakes up the processor 260 such that power is supplied to the processor 260 and the processor 260 performs a certain operation but power is not supplied to a display, and thus image data is not output.

For example, in the normal mode, the display device 160 may display a certain image. As for another example, in the LPM, the display of the display device 160 may be turned off and thus in a black screen state, but the processor 260 may perform a certain operation.

Also, the suspend mode may indicate a mode in which only least power is supplied such that power consumption of the display device 160 is reduced.

The suspend mode is a mode in which there is a minimal supply of power to the display device 160, and indicates an operation mode in which power is supplied to the communicator 265 to transmit and receive a control signal or certain data to and from the external device 190. In the suspend mode, power supply to a component other than the communicator 265 may be blocked or disabled. The suspend mode may also be referred to as a sleep mode.

As described above, power may be supplied to the communicator 265 and the processor 260 in the LPM. In the LPM, the processor 260 may determine whether to change the operation mode of the display device 160 to the normal mode. When it is not required to change the display device 160 to the normal mode based on a result of the determination, the processor 260 may maintain the suspend mode.

Here, "wake up" may denote an operation in which the display device 160 in the suspend mode is activated to enter the LPM or the normal mode.

As described above, when the display device 160 is in the suspend mode, the processor 260 does not operate because power supply to the processor 260 is blocked (or disabled) and only the communicator 265 is operable because power is supplied only to the communicator 265.

A remote turn-on function of the display device 160 may perform an IoT wake-up function upon receiving a turn-on message via a TCP session connected between the display device 160 and the IoT cloud server 210 when a remote turn-on command is received from the external device 190, and may operate as follows.

Upon receiving a turn-off request regarding the display device 160, the IoT application of the display device 160 transmits source Internet Protocol (IP) information of the IoT cloud server 210 to the communicator 265 included in the display device 160. When (or based on) the display device 160 enters the suspend mode, the communicator 265 maintains an always-on state by continuously receiving power. In particular, the communicator 265 maintains a connection with the AP 230 by maintaining the always-on state even in the suspend mode. Here, the communicator 265 may include a Wi-Fi chip communicable according to a Wi-Fi communication standard.

To remotely turn on the display device 160, the external device 190 may transmit a command requesting to turn on the display device 160 to the AP 230 (operation S201).

The communicator 265 may receive a packet corresponding to the command from the IoT cloud server 210 (operation S202). Then, the communicator 265 may parse source IP field information present inside a received IP packet to verify whether the parsed source IP is a registered IP. When the parsed source IP is the registered IP, the communicator 265 may generate a wake-up pulse for waking up the processor 260 to control the display device 160 to enter the LPM.

When (or based on) the display device 160 enters the LPM, power is supplied to the processor 260. Next, it may be determined whether to turn on the display of the display device 160 by verifying whether a packet received by the communicator 265 from the IoT application included in the processor 260 is data normally requesting turning on of the display device 160. Here, when the display is in an off state, the display maintains the black screen state. When the display is in an on state, the display may maintain an output state of a meaningful screen instead of a black screen, for example, a state of outputting image data.

Here, for the display device 160 to normally receive a signal transmitted from the external device 190, the display device 160 and the external device 190 need to always maintain a communication connection. For example, the display device 160 needs to maintain a communication connection with the external device 190 even when the display device 160 is turned off and enters the suspend mode.

In particular, for the display device 160 implementing the IoT platform to be woken up by the external device 190, the display device 160 needs to normally receive a packet requesting turn-on from the IoT cloud server 210. For the display device 160 in the suspend mode to normally receive the packet requesting turn-on from the IoT cloud server 210, a TCP session performing communication according to a TCP/IP protocol between the display device 160 and the IoT cloud server 210 needs to be always maintained.

The display device 160 may perform an operation for maintaining mutual communication connection at intervals of certain time with the IoT cloud server 210. Here, the operation for maintaining communication connection is referred to as a "keep-alive" operation.

In the related art, a display device performs an OCF keep-alive operation as a keep-alive operation for implementing an IoT platform. The OCF keep-alive operation is a keep-alive operation for maintaining a TCP session according to an OCF standard. Also, an OCF communication protocol may denote a communication protocol performing communication according to the OCF standard. Hereinafter, for convenience of description, the OCF communication protocol is referred to as an OCF protocol. In other words, the OCF keep-alive operation may denote a keep-alive operation performed according to the OCF protocol.

In particular, the OCF keep-alive operation is a constrained application protocol (CoAP) message-based application keep-alive operation. Here, the application keep-alive operation denotes a keep-alive operation performed at an application end in the processor 260. In the OCF standard, a message needs to be transmitted or received according to a TCP specification (RFC 2823), and a connection of a TCP session needs to be maintained in an application layer instead of a network layer. Also, to maintain the connection of the TCP session, a timer may be set for a period (hereinafter, an "OCF keep-alive operation period") where an OCF keep-alive operation is performed.

In particular, when the display device 160 is turned off and is in the suspend mode, the processor 260 that is an operation subject capable of performing the OCF keep-alive operation is also in the suspend mode. Accordingly, to perform the OCF keep-alive operation, the processor 260 needs to be woken up every OCF keep-alive operation period. In other words, the processor 260 needs to perform an operation of transmitting and receiving a message for performing the OCF keep-alive operation by being woken up every OCF keep-alive operation period and turn into the LPM. When the processor 260 performs the operation of transmitting and receiving the message for performing the OCF keep-alive operation, the timer where the OCF keep-alive operation period is set may be updated.

In particular, the processor 260 transmits an OCF keep-alive packet to the IoT cloud server 210 to perform the OCF keep-alive operation. In response to the transmission of the OCF keep-alive packet, the IoT cloud server 210 may transmit an OCF keep-alive response message to the display device 160. When the display device 160 normally receives the OCF keep-alive response message from the IoT cloud server 210, the timer in which the OCF keep-alive operation period is set is updated and the display device 160 enters the suspend mode again.

In the related art, to maintain an IoT environment, as described above, the processor 260 operates as an operation subject to perform the OCF keep-alive operation every certain period. In other words, to maintain the IoT environment after the display device 160 is turned off, the processor 260 needs to be woken up every keep-alive operation period (in particular, the OCF keep-alive operation period) and power consumption to wake up the processor 260 every keep-alive operation period is generated.

One or more embodiments provide a display device and an operating method of the same, wherein generated power consumption is reduced while repeatedly performing a keep-alive operation every certain period.

The display device and operating method of the same, wherein power consumption to perform a keep-alive operation is reduced, is described in detail below with reference to accompanying drawings.

Figure 3:
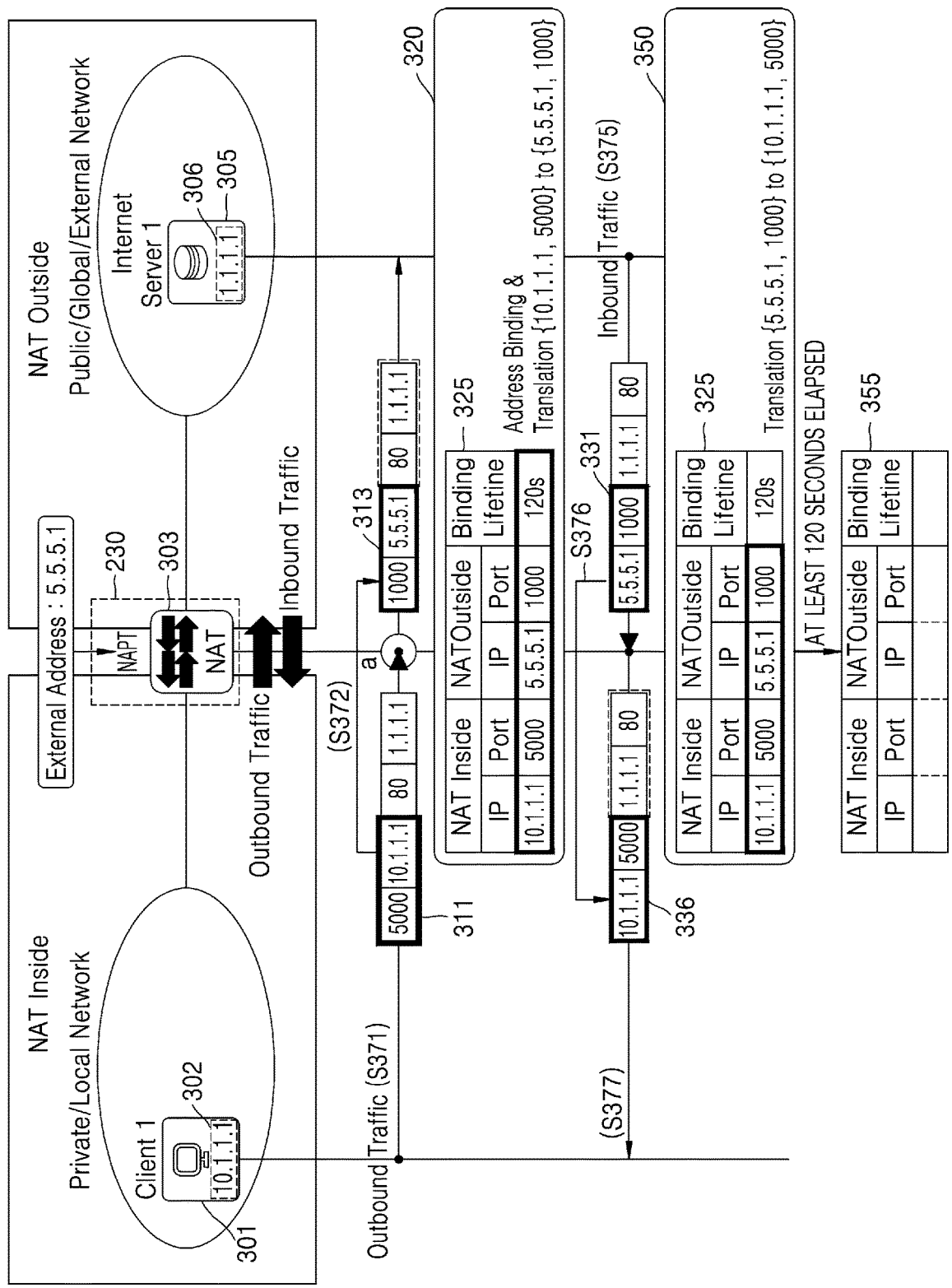
FIG. 3 is a diagram for describing an operation of an access point (AP) of FIG. 2.

FIG. 3 is a diagram for describing an operation of an AP 230 of FIG. 2.

To maintain an IoT environment, an electronic device located at a long distance performs a keep-alive operation to maintain a communicable state with the IoT cloud server 210.

In FIG. 3, a display device 301, a server 305, and the AP 230 may respectively correspond to the display device 160, the IoT cloud server 210, and the AP 230 of FIG. 1. In other words, the server 305 may denote an IoT cloud server for supporting an IoT platform. Thus, while describing components of FIG. 3, details overlapping those of FIG. 2 may not be repeated below. According to an embodiment, the display device 301 may operate as a client device with respect to a communication connection via the AP 230. Also, in FIG. 3, the display device 301 is described as an example of a client device, but an electronic device other than the display device 301 may be a client device.

When messages, for example, an OCF keep-alive packet and an OCF keep-alive response message, are transmitted and received for the keep-alive operation between the display device 301 and the server 305 connected via the IoT platform, "a lifetime of a network address translation (NAT) binding table entry" set for an NAT function performed by the AP 230 is updated.

With respect to the IoT platform, a plurality of electronic devices may be connected in a private network (for example, Wi-Fi that is in charge of wireless communication in the house 100 of FIG. 1). Here, the plurality of electronic devices may respectively correspond to a plurality of entries. Also, an NAT binding table may include information about each of the plurality of electronic devices connected to the private network (in particular, information about a network address and a lifetime). Also, one entry in the NAT binding table may correspond to one electronic device. Here, the "lifetime" may denote the "lifetime of the NAT binding table entry" described below.

NAT is a function of connecting the display device 301 to a public network (for example, the Internet) such that the display device 301 located in the private network (for example, a Wi-Fi network for wireless communication in the house 100 of FIG. 1) is communicable via the public network. In particular, NAT is a function of inter-translating a private address used in the private network to an address (for example, a public internet protocol (IP) address) used in the public network.

An NAT function is currently included in all wired and wireless APs 230 and may perform the following operations. Hereinafter, for convenience of description, a component that performs the NAT function in the AP 230 will be referred to as an "NAT device."

Referring to FIG. 3, outbound traffic indicates a flow of data transmitted from the display device 301 that is a client device to the AP 230 or Internet, and inbound traffic indicates a flow of data transmitted from the server 305 or Internet to the AP 230.

First, an address binding operation may be performed to perform the NAT function. In the address binding operation, an NAT device 303 included in the AP 230 determines a public IP address corresponding to a private IP address and generates a session entry in an NAT binding entry with respect to outbound traffic transmitted by a client device (for example, the display device 301) having the private IP address. Here, the private IP address and the public IP address may have a one-to-one mapping relationship. Accordingly, an NAT binding table 325 may be obtained. In FIG. 3, the NAT binding table 325 shows information about a network address and a lifetime for the display device 301.

Also, in the NAT binding table 325 of FIG. 3, an "NAT inside" entry may include network information corresponding to the display device 301, for example, an IP address and a port number, and an "NAT outside" entry may include network information corresponding to the server 305, for example, an IP address and a port number.

Next, an address lookup and translation operation may be performed. In particular, when a packet is received in an outbound direction (operation S371), a private source IP address 311 is translated to a public source IP address 313 by referring to the NAT binding table 325 (operation S372), and a packet received based on a translated address is transmitted via the Internet. Meanwhile, when a packet is received in an inbound direction (operation S375), a public destination IP address 331 is translated to a private destination IP address 336 that is an IP of the display device 301 by referring to the NAT binding table 325 (operation S376). Accordingly, the packet received in the inbound direction is transmitted to the display device 301 (operation S377).

Subsequently, when (or based on) there is no transmission or reception of a packet through the AP 230 for a certain period of time after inbound traffic and outbound traffic occurred, an address unbinding operation is performed. In particular, when a packet does not flow for a certain period of time with respect to a corresponding entry (for example, the display device 301) of the NAT binding table 325, a session entry of the NAT binding table 325 is deleted. Here, the certain period of time may vary based on a specification of an NAT device.

Referring to FIG. 3, when the outbound traffic of operation S371 and the inbound traffic of operation S375 occur, a timer that set a binding lifetime is reset and counts a new time. In particular, when the inbound traffic and the outbound traffic occur, the timer for counting the binding lifetime is reset and counts a time (for example, 120 seconds) set as the binding lifetime again from 0 seconds. When the inbound traffic and the outbound traffic occur again within a counted time (in particular, a time set as the binding lifetime), the timer for counting the binding lifetime is reset.

In other words, as in an NAT binding table 355 of FIG. 3, when 120 seconds elapse after the timer is reset, information corresponding to a relevant entry in the NAT binding table 355 is deleted. Also, when the inbound traffic and the outbound traffic occur again before 120 seconds elapse after the timer is reset, information corresponding to the relevant entry in the NAT binding table 325 is not deleted and the timer for counting the binding lifetime is reset.

Here, a time when the session entry of the NAT binding table 325 is deleted when a packet does not flow may be referred to as "a lifetime of an NAT binding table entry." In other words, "the lifetime of the NAT binding table entry" is a lifetime of an entry corresponding to the display device 301, which is included in the NAT binding table 325. In describing an embodiment, for convenience of description, "the lifetime of the NAT banding table entry" will simply be referred to as a "binding lifetime."

In FIG. 3, the binding lifetime is 120 seconds by way of example. When transmission of inbound traffic and outbound traffic does not occur within 120 seconds that is the binding lifetime, the AP 230 deletes information about the corresponding entry (for example, the display device 301) as in the NAT binding table 355. When the information about the corresponding entry in the NAT binding table 355 is deleted, it is not possible to transmit a control request to the corresponding entry even when the control request according to IoT is generated for the corresponding entry (in particular, the display device 301). This is because translation information about an address for network connection is deleted and, thus, it is not possible to perform address translation required for network translation.

Accordingly, to maintain or activate the IoT platform, the keep-alive operation described with reference to FIG. 2 is to be performed within the binding lifetime described above. In other words, a keep-alive operation period is to have a value within the binding lifetime set in the AP 230.

According to an embodiment, the keep-alive operation is performed such that the binding lifetime set in the AP 230 is continuously updated without being deleted, and without having to wake up the processor 260 for every binding lifetime set in the AP 230. Accordingly, power consumption occurring to wake up the processor 260 every binding lifetime may be reduced.

Hereinafter, a configuration and operations of an electronic device according to an embodiment is described in detail with reference to FIGS. 4 through 8.

Also, hereinafter, an example in which an electronic device according to an embodiment is a display device is described, but it is understood that this is just an example.

Figure 4:
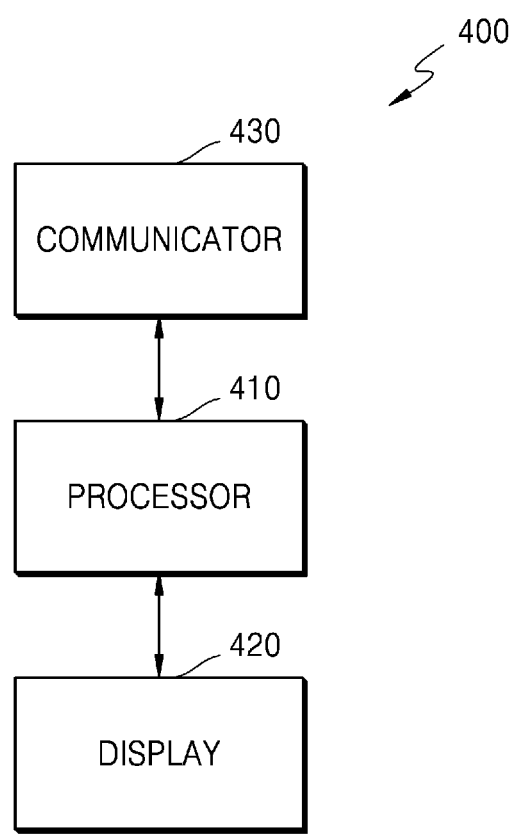
FIG. 4 is a block diagram of a display device according to an embodiment.

FIG. 4 is a block diagram of a display device 400 according to an embodiment. The display device 400 of FIG. 4 may correspond to the display device 160 or 301 of FIG. 2 or FIG. 3. Thus, descriptions of the display device 400, which overlap those of FIGS. 2 and 3, may not be repeated below.

Referring to FIG. 4, the display device 400 includes a processor 410 (e.g., at least one processor), a display 420, and a communicator 430 (e.g., at least one communicator).

The processor 410 performs at least one instruction to control an intended operation to be performed.

The display 420 outputs an image. In particular, the display 420 may output an image corresponding to video data via a display panel included therein such that a user visually recognizes the video data.

The communicator 430 performs communication with a server via at least one wireless network. Here, the server may be an IoT cloud server.

The processor 410 may receive a first packet from the server by communicating with the server to perform a first keep-alive operation according to a first communication protocol, generate and transmit, to the communicator 430, a second packet for performing a second keep-alive operation according to a second communication protocol with the server, based on data included in the received first packet, and then enter a suspend mode.

Next, the communicator 430 performs the second keep-alive operation by transmitting the second packet to the server at intervals of a first period after the processor 410 enters the suspend mode.

The server may include a first server supporting communication according to the first communication protocol. Hereinafter, for convenience of description, an example in which the first server is an OCF cloud server supporting communication according to an OCF communication protocol is described and illustrated, but it is understood that this is just an example.

Here, the first communication protocol and the second communication protocol may be different communication protocols.

The first communication protocol may be a communication protocol used by the processor 410 to perform a keep-alive operation while the processor 410 of the display device 400 is woken up, i.e., while power is supplied to the processor 410. The second communication protocol may be a communication protocol used to perform the keep-alive operation while the display device 400 is in a suspend mode.

In particular, the first communication protocol may be an OCF communication protocol, and the second communication protocol may be a TCP/IP communication protocol.

Also, the server may be an IoT cloud server and the first server may be an OCF cloud server.

The first keep-alive operation may be an OCF keep-alive operation and the second keep-alive operation may be a TCP keep-alive operation.

Hereinafter, an example in which the first communication protocol and the second communication protocol described above are respectively an OCF communication protocol and a TCP/IP communication protocol is described and illustrated below. Also, an example in which the first keep-alive operation is an OCF keep-alive operation and the second keep-alive operation is a TCP keep-alive operation is described and illustrated below.

In particular, the processor 410 may update TCP session information based on the data included in the first packet, and upon (or based on) receiving a command requesting to enter the suspend mode, generate a second data packet based on the updated TCP session information.

The processor 410 may generate a TCP keep-alive packet that is the second data packet having a fixed size and not including payload data, based on the updated TCP session information.

The processor 410 may transmit an OCF keep-alive packet according to the OCF communication protocol to the server and receive a response packet corresponding to the OCF keep-alive packet from the server to perform the first keep-alive operation.

In particular, the processor 410 receives an OCF response packet that is the first packet by communicating with an OCF cloud server that is the first server included in an IoT cloud server to perform an OCF keep-alive operation, generates and transmits (or provides), to the communicator 430, a TCP keep-alive packet that is the second packet for performing a TCP keep-alive operation, and then enters the suspend mode. Then, after entering the suspend mode, the communicator 430 may perform the second keep-alive operation (in particular, the TCP keep-alive operation) by transmitting the TCP keep-alive packet that is the second packet to the IoT cloud server every first period.

The second packet may be the TCP keep-alive packet transmitted to the server, in particular, the IoT cloud server 210 of FIG. 2, to perform the TCP keep-alive operation. Hereinafter, an example in which the second packet is the TCP keep-alive packet is described and illustrated below.

Also, the processor 410 may be woken up every second period greater than the first period to perform the OCF keep-alive operation. Here, the first period may indicate an operation period of the TCP keep-alive operation and the second period may denote an operation period of the OCF keep-alive operation.

According to an embodiment, the processor 410 enters the suspend mode after performing the OCF keep-alive operation. After entering the suspend mode, the communicator 430 performs the TCP keep-alive operation at least once. Accordingly, when the TCP keep-alive operation is performed at least once, the inbound traffic and the outbound traffic occur in the AP 230 of FIG. 3, and thus information about the corresponding entry in the NAT binding table 355 may be prevented from being deleted. In other words, when the TCP keep-alive operation is performed, the binding lifetime in the NAT binding table 355 is reset and the timer counting the time set as the binding lifetime counts the time again based on a point of time when the TCP keep-alive operation is performed. In other words, when the TCP keep-alive operation is performed at least once, the display device 400 continuously maintains a communication connection with the IoT cloud server and continuously maintains the IoT environment in an active state.

Next, according to an embodiment, the TCP keep-alive operation is performed by the communicator 430 after the display device 400 enters the suspend mode. Accordingly, because the communicator 430 performs the TCP keep-alive operation, the processor 410 does not need to separately wake up to perform a keep-alive operation. As such, power consumption consumed by the processor 410 to wake up and perform the keep-alive operation may be reduced.

Further, the processor 410 may control overall operations of the display device 400. The processor 410 may control other components included in the display device 400 such that a certain operation is performed.

In particular, the processor 410 may execute at least one instruction stored therein to perform the certain operation. In addition, the processor 410 may be configured as a main central processing unit (CPU).

The processor 410 may include an internal memory and at least one processor (or processing core) executing at least one stored program. Here, the internal memory of the processor 410 may store one or more instructions. Also, the processor 410 may perform the certain operation by executing at least one of the one or more instructions stored in the internal memory.

The processor 410 may include a random access memory (RAM) storing a signal or data input from the outside of the display device 400 or used as a storage area corresponding to various tasks performed by the display device 400, a read-only memory (ROM) storing a control program and/or a plurality of instructions for control of the display device 400, and at least one processor.

In addition, the processor 410 may include a graphics processing unit (GPU) for graphic processing corresponding to a video. Alternatively, the processor 410 may be implemented as a system-on-chip (SoC) in which a core and the GPU are integrated. Alternatively, the processor 410 may include a single core, a dual core, a triple core, a quad core, or a multiple core.

The communicator 430 may transmit and receive data or signals to and from an external device or external server under control of the processor 410. According to an embodiment, the communicator 430 may communicate with the server, in particular, the IoT cloud server, via at least one wireless network. The communicator 430 may communicate with the IoT cloud server by being connected to an AP via at least one wireless network.

The communicator 430 may transmit and receive data or signals via at least one of a wireless local area network (WLAN) (for example, Wi-Fi), Bluetooth, wired Ethernet, infrared (IR), Bluetooth low energy (BLE), ultrasound, Zigbee, high-definition multimedia interface (HDMI), etc. Here, the communicator 430 may include at least one communication module capable of transmitting and receiving data according to communication standards corresponding to WLAN (Wi-Fi), Bluetooth, wired Ethernet, IR, BLE, ultrasound, Zigbee, HDMI, etc.

A WLAN communication module may include a Wi-Fi communication module capable of performing wireless communication according to a Wi-Fi communication standard. The Wi-Fi communication module may include a Wi-Fi chipset that is a Wi-Fi module capable of transmitting and receiving data in a form of packet according to the Wi-Fi communication standard.

In particular, a communication module included in the communicator 430 may include a communication module corresponding to a wired and wireless network in charge of connection below a MAC layer (layer 2), for example, a Wi-Fi chipset that is a Wi-Fi module (wireless) and/or an Ethernet module (wired), and may operate independently from the processor 410 such as a main CPU.

Also, the communicator 430 may include a short-distance communication module, for example, an IR communication module, capable of receiving a control command from a remote controller. In this case, the communicator 430 may receive a control command from the remote controller. Also, the communicator 430 may receive a control command based on the IoT platform via the WLAN communication module. Here, the control command may be a control command requesting the display device 400 to be turned off.

In the above example, the processor 410 may control the display device 400 to enter the suspend mode in response to the received control command. In particular, the display 420 of the display device 400 that entered the suspend mode is switched to a black screen state, and power is supplied only to the communicator 430 while power supply to other components is blocked or disabled.

According to an embodiment, before the display device 400 enters the suspend mode, the processor 410 may periodically perform the OCF keep-alive operation to maintain the display device 400 and the IoT environment in the active state. When the display device 400 enters the suspend mode, the communicator 430 may control the TCP keep-alive operation to be performed at least once. Accordingly, after entering the suspend mode, the communicator 430 operates as an operation subject performing the keep-alive operation. In other words, after the display device 400 enters the suspend mode, the communicator 430 performs the keep-alive operation such that the display device 400 continuously maintains the IoT environment in the active state.

Specific operations according to an embodiment, which maintain the IoT platform in the active state by performing the keep-alive operation, are described in detail below with reference to FIGS. 8 through 16. Hereinafter, like reference numerals denote like elements in the drawings.

Figure 5:
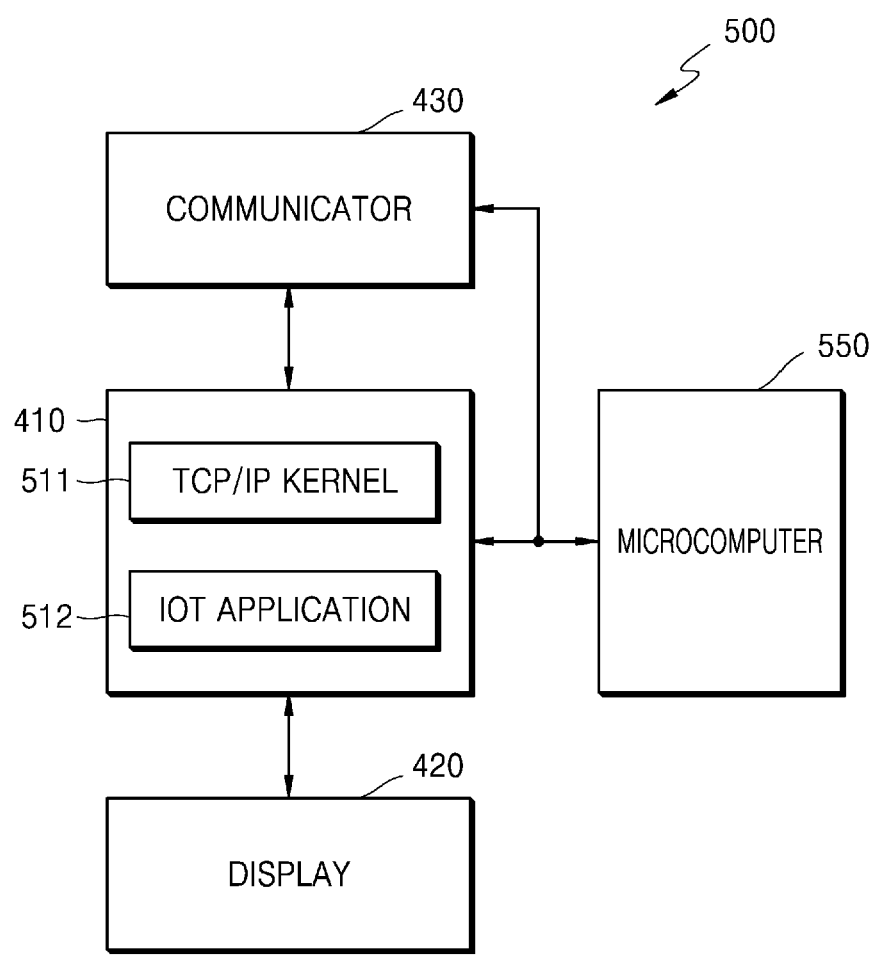
FIG. 5 is a block diagram showing in detail a display device according to an embodiment.

FIG. 5 is a block diagram showing in detail a display device 500 according to an embodiment. The display device 500 corresponds to the display device 400 of FIG. 4.

According to an embodiment, the processor 410 may control communication performed according to a TCP/IP communication protocol. Also, the processor 410 may perform a function for implementing an IoT platform.

In particular, the processor 410 may include a TCP/IP kernel 511 and an IoT application 512. The TCP/IP kernel 511 performs communication with another electronic device or server according to a TCP/IP communication protocol. In particular, the TCP/IP kernel 511 may perform communication with an IoT cloud server via an AP according to the TCP/IP communication protocol.

The IoT application 512 is an application performing a function for implementing an IoT platform. In particular, the IoT application 512 may control operations to maintain the IoT platform in an active state or change the IoT platform to an inactive state to be performed.

In particular, the IoT application 512 may perform a device registration process between servers or external devices connected to the display device 500 via IoT. For example, the IoT application 512 may perform device registration on a server (for example, an IoT cloud server) or an external device (for example, a mobile device of a user) connected to the display device 500 via the IoT.

When the device registration is normally performed, the IoT application 512 may transmit, to the communicator 430, an IP address of the IoT cloud server used to implement the IoT platform. Then, the IoT application 512 may set a TCP session between the display device 500 and the IoT cloud server such that a communication connection between the display device 500 and the IoT cloud server is always maintained. Here, when the TCP session is set, information about the set TCP session may be referred to as "TCP session information."

According to an embodiment, the processor 410, in particular, the IoT application 512, may obtain TCP session information present after an OCF keep-alive operation is performed. Then, a TCP keep-alive packet that is a second packet and an operation period value of a TCP keep-alive operation may be generated based on the TCP session information. The processor 410 may transmit the TCP keep-alive packet and the operation period value of the TCP keep-alive operation to the communicator 430. When such transmission is completed, the processor 410 may enter a suspend mode.

In particular, the processor 410 may perform the OCF keep-alive operation period to transmit an OCF keep-alive packet to a server. Then, in response to the reception of the OCF keep-alive packet, the server may transmit an OCF keep-alive response packet to the display device 400 via an AP. Then, the processor 410 may update the TCP session information, based on data included in the received OCF keep-alive response packet, in particular, application (app) data or payload data. When (or based on) a command requesting to enter the suspend mode is received, the TCP keep-alive packet that is the second packet may be generated based on the updated TCP session information.

Here, an operation period of the TCP keep-alive operation is a time interval where the TCP keep-alive operation is performed and may denote a value of the first period described above. Because the operation period of the TCP keep-alive operation may be a time value regarding a period where the TCP keep-alive packet is transmitted, the operation period of the TCP keep-alive operation may also refer to a "transmission period of the TCP keep-alive packet." In FIG. 5, the TCP/IP kernel 511 and the IoT application 512 may be implemented as individual modules or chips that are physically distinguished from each other. Also, in FIG. 5, the TCP/IP kernel 511 and the IoT application 512 are illustrated as individual components, but the TCP/IP kernel 511 and the IoT application 512 may be integrated on one physical chip.

The display device 500 may include the microcomputer 550.

The microcomputer 550 may operate as a timer. In particular, the microcomputer 550 may operate to wake up the processor 410 every certain period. The microcomputer 550 may periodically control the processor 410 in the suspend mode to wake up according to the OCF keep-alive operation period. In this case, an operation mode of the processor 410 woken up by control of the microcomputer 550 may be switched from the suspend mode to the LPM.

In particular, the microcomputer 550 checks a wake-up pulse generated by the communicator 430 to wake up the processor 410, resumes the processor 410, and transmits a set boot reason value. Then, when the processor 410 is in the suspend mode, the microcomputer 550 may periodically wake up the processor 410 according to a time interval set by the processor 410 (for example, a time interval according to timer information).

Also, even when the display device 500 is in the suspend mode, the microcomputer 550 may maintain an on-state by receiving power for operating as a timer. Thus, even in the suspend mode, the microcomputer 550 is able to count a set time by driving the timer and periodically wake up the processor 410 at set time intervals. The microcomputer 550 may be included in the communicator 430. In this case, when the display device 500 enters the suspend mode, power may be supplied to the microcomputer 550 included in the communicator 430 when power is supplied to the communicator 430.

When the display device 500 according to an embodiment does not include the microcomputer 550 as a separate component, the communicator 430 may perform a timer operation of the microcomputer 550.

Figure 6:
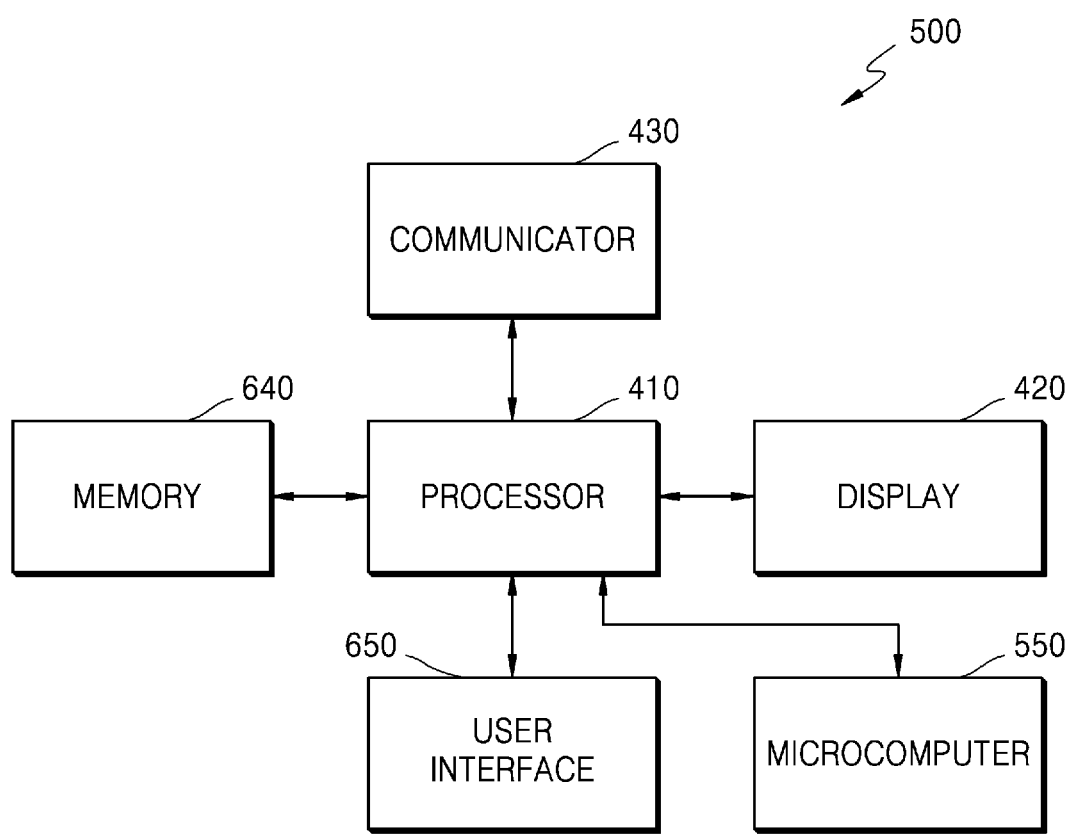
FIG. 6 is a block diagram of a display device according to another embodiment.

FIG. 6 is a block diagram of a display device 600 according to another embodiment.

Referring to FIG. 6, the display device 600 may further include at least one of a memory 640 or a user interface 650 as compared to the display device 400 shown in FIG. 4 and the display device 500 shown in FIG. 5.

The memory 640 may store at least one instruction. The memory 640 may store at least one instruction executed by the processor 410. Also, the memory 640 may store at least one program executed by the processor 410.

In particular, the memory 640 may include at least one type of storage medium among a flash memory type, a hard disk type, a multimedia card micro type, a card type memory (for example, a secure digital (SD) or an extreme digital (XD) memory), a random access memory (RAM), a static RAM (SRAM), a read-only memory (ROM), an electrically erasable programmable ROM (EEPROM), a programmable ROM (PROM), a magnetic memory, a magnetic disk, and an optical disk.

The user interface 650 may receive a user input for controlling the display device 600. The user interface 650 may include a user input device including a touch panel detecting a user's touch, a button receiving a push operation of the user, a wheel receiving a rotation operation of the user, a keyboard, and a dome switch, but is not limited thereto.

The user interface 650 may include a voice recognition device for voice recognition. For example, the voice recognition device may be a microphone and may receive the user's voice command or voice request. Accordingly, the processor 410 may control an operation corresponding to the voice command or voice request to be performed.

Also, the user interface 650 may include a motion detection sensor. For example, the motion detection sensor may detect movement of the display device 600 and receive the detected movement as a user input. Also, the voice recognition device and the motion detection sensor may not be included in the user interface 650, but may be included in the display device 600 as independent modules from the user interface 650.

According to an embodiment, the user interface 650 may receive a user input of requesting to turn off the display device 600 while the display device 600 is displaying an image. Then, the processor 410 may control the display device 600 to enter a suspend mode in response to (or based on) the received user input. In particular, the display 420 of the display device 600 that entered the suspend mode is switched to a black screen state, and power is supplied only to the communicator 430 while power supply to other components is blocked or disabled.

Figure 7:
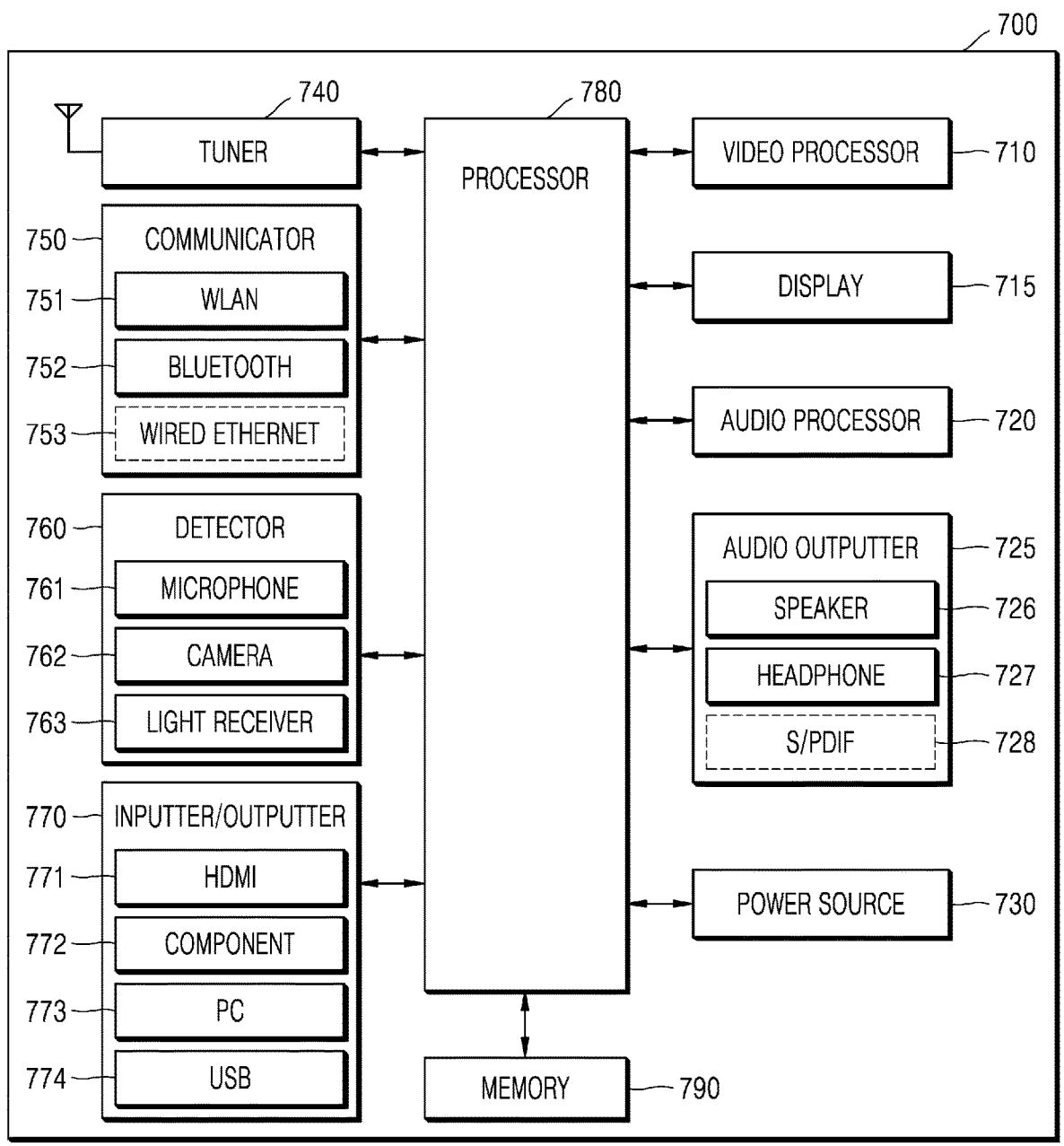
FIG. 7 is a block diagram of a display device according to another embodiment.

FIG. 7 is a block diagram of a display device 700 according to another embodiment.

The display device 700 may correspond to the display device 160, 301, 400, 500, or 600 according to the embodiments described above with reference to FIGS. 2 through 6.

Thus, descriptions of the display device 700, which overlap those of FIGS. 2 through 6, may not be repeated below.

Referring to FIG. 7, the display device 700 includes a video processor 710, a display 715, an audio processor 720, an audio outputter 725, a power supply 730, a tuner 740, a communicator 750, a detector 760, an inputter/outputter 770, a processor 780, and a memory 790.

Here, the processor 780 may correspond to the processor 410 of FIG. 6. The communicator 750, the display 715, and the memory 790 of the display device 700 may respectively correspond to the communicator 430, the display 420, and the memory 640 of FIG. 6.

The video processor 710 performs processes on video data received by the display device 700. The video processor 710 may perform various image processes, such as decoding, scaling, noise filtering, frame rate converting, and resolution converting, on the video data.

The processor 780 may receive a request to record the video data processed by the video processor 710, encrypt the video data, and record the encrypted video data in a memory device, for example, RAM, included in the memory 790 or the processor 780.

According to an embodiment, the processor 780 performs an OCF keep-alive operation by communicating with an OCF cloud server included in an IoT cloud server, generates and transmits, to the communicator 750, a TCP keep-alive packet for performing a TCP keep-alive operation, and then enters a suspend mode. After entering the suspend mode, the communicator 750 may perform the TCP keep-alive operation every first period, based on TCP keep-alive information.

According to an embodiment, the processor 780 enters the suspend mode after performing the OCF keep-alive operation. After entering the suspend mode, the communicator 750 may perform the TCP keep-alive operation at least once.

The display 715 displays, on a screen, a video included in a broadcast signal received via the tuner 740 under control of the processor 780. Further, the display 715 may display content (for example, a moving image) input via the communicator 750 or the inputter/outputter 770.

The display 715 may output an image stored in the memory 790 under control of the processor 780. The display 715 may display a voice user interface (UI) including, for example, a voice command guide, for performing a voice recognition task corresponding to voice recognition or a motion UI including, for example, a user motion guide for motion recognition, for performing a motion recognition task corresponding to motion recognition.

The audio processor 720 performs at least one process on audio data. The audio processor 720 may perform various processes, such as decoding, amplification, noise filtering, etc., on the audio data. The audio processor 720 may include a plurality of audio processing modules to process audio corresponding to a plurality of pieces of content.

The audio outputter 725 outputs audio included in a broadcast signal received via the tuner 740 under control of the processor 780. The audio outputter 725 may output the audio (for example, voice or sound) input via the communicator 750 or the inputter/outputter 770. Also, the audio outputter 725 may output audio stored in the memory 790 under control of the processor 780. The audio outputter 725 may include at least one of a speaker 726, a headphone output terminal 727, or a SONY/PHILIPS digital interface (S/PDIF) terminal 728. The audio outputter 725 may include a combination of the speaker 726, the headphone output terminal 727, and the S/PDIF terminal 728.

The power supply 730 supplies power input from an external power source to components inside the display device 700 under control of the processor 780. Also, the power supply 730 may supply power output from one or more batteries located inside the display device 700 to the components inside the display device 700 under control of the processor 780.

The tuner 740 may tune and select only a frequency of a channel to be received by the display device 700 among many radio wave components by performing amplification, mixing, and resonance on a broadcast signal received via wires or wirelessly. The broadcast signal includes audio, video, and additional information (for example, an electronic program guide (EPG)).

The tuner 740 may receive a broadcast signal in a frequency band corresponding to a channel number (for example, a cable broadcast no. 506) according to a user input (for example, a control signal received from an external control device, such as a remote controller, corresponding to a channel number input, channel up-down input, or a channel input from an EPG screen).

The tuner 740 may receive a broadcast signal from various sources, such as terrestrial broadcasting, cable broadcasting, satellite broadcasting, and Internet broadcasting. The tuner 740 may receive a broadcast signal from a source such as analog broadcasting or digital broadcasting. The broadcast signal received via the tuner 740 is decoded (for example, audio-decoded, video-decoded, and/or additional information-decoded) and divided into audio, video, and/or additional information. The divided audio, video, and/or additional information may be stored in the memory 790 under control of the processor 780.

The number of tuners 740 of the display device 700 may be one or more. When there are a plurality of tuners 740 according to an embodiment, a plurality of broadcast signals may be output to a plurality of windows forming a multi-window screen provided to the display 715.

The tuner 740 may be implemented as an all-in-one with the display device 700 or may be implemented as a separate device including a tuner electrically connected to the display device 700 (for example, a set-top box or a tuner connected to the inputter/outputter 770).

The communicator 750 may connect the display device 700 to an external device (for example, an audio device) under control of the processor 780. The processor 780 may transmit/receive content to/from an external device connected via the communicator 750, download an application from the external device, or perform web browsing. In particular, the communicator 750 may receive content from an external device by accessing a network.

As described above, the communicator 750 may include at least one of a short-distance communication module, a wired communication module, or a mobile communication module.

In FIG. 7, the communicator 750 includes one of a WLAN 751, a Bluetooth communicator 752, and wired Ethernet interface 753.

Also, the communicator 750 may include a module combination including one or more of the WLAN 751, the Bluetooth communicator 752, and the wired Ethernet interface 753. The communicator 750 may receive a control signal of a control device under control of the processor 780. The control signal may be a Bluetooth type, a radio frequency (RF) signal type, a Wi-Fi type, etc.

The communicator 750 may further include a short-distance communication module other than the Bluetooth communicator 752, such as a near field communication (NFC) module or a BLE module.

The detector 760 detects voice, image, and/or interaction of a user.

A microphone 761 receives a voice uttered by the user. The microphone 761 may convert the received voice into an electric signal and output the electric signal to the processor 780. The user's voice may include, for example, a voice input corresponding to a menu or function of the display device 700. For example, a recommended recognition range of the microphone 761 is within 4 m from the microphone 761 to a user's location, and the recognition range may vary depending on the volume of user's voice and a surrounding environment (for example, a speaker sound or ambient noise).

The microphone 761 may be integrated into or separated from the display device 700. The separated microphone 761 may be electrically connected to the display device 700 via the communicator 750 or the inputter/outputter 770.

For example, the microphone 761 may be excluded depending on the performance and structure of the display device 700.

A camera 762 receives an image (for example, consecutive frames) corresponding to motion of the user including a gesture within a camera recognition range. For example, a recognition range of the camera 762 may be a distance within 0.1 to 5 m from the camera 762 to the user. The user's motion may include a body part of the user, such as a face, a facial expression, a hand, a fist, or a finger, or motion of a part of the user. The camera 762 may convert the received image to an electric signal and output the electric signal to the processor 780 under control of the processor 780.

The processor 780 may select a menu displayed on the display device 700 by using a received recognition result motion or perform control corresponding to the recognition result. For example, channel adjustment, volume adjustment, or indicator movement may be performed.

The camera 762 may include a lens and an image sensor. The camera 762 may support optical zoom or digital zoom by using a plurality of lenses and image processing. The recognition range of the camera 762 may be variably set depending on an angle of the camera 762 and a surrounding environment condition. When the camera 762 includes a plurality of cameras, a three-dimensional (3D) still image or 3D motion may be received by using the plurality of cameras.

The camera 762 may be integrated to or separated from the display device 700. A separate device including the separated camera 762 may be electrically connected to the display device 700 via the communicator 750 or the inputter/outputter 770.

For example, the camera 762 may be excluded depending on the performance and structure of the display device 700.

A light receiver 763 receives an optical signal (including a control signal) received from an external control device via a light window of a bezel of the display 715. The light receiver 763 may receive an optical signal corresponding to a user input (for example, touch, press, touch gesture, voice, or motion) from a control device. A control signal may be extracted from the received light signal under control of the processor 780.

For example, the light receiver 763 may receive a signal corresponding to a pointing location of the control device and transmit the signal to the processor 780. For example, when a user interface screen for receiving data or a command from the user is output via the display 715 and the user is to input the data or command to the display device 700 via the control device, the light receiver 763 may receive a signal corresponding to movement of the control device and transmit the received signal to the processor 780 when the user moves the control device while touching a touch pad provided in the control device. Also, the light receiver 763 may receive a signal indicating that a specific button provided in the control device is pressed and transmit the received signal to the processor 780. For example, when the user presses a button type touch pad provided in the control device with a finger, the light receiver 763 may receive a signal indicating that the button type touch pad is pressed and transmit the received signal to the processor 780. For example, the signal indicating that the button type touch pad is pressed may be used as a signal for selecting one of items.

The inputter/outputter 770 receives video (for example, a moving image), audio (for example, voice or music), and additional information (for example, EPG) from the outside of the display device 700 under control of the processor 780. The inputter/outputter 770 may include at least one of an HDMI port 771, a component jack 772, a PC port 773, and a universal serial bus (USB) port 774. The inputter/outputter 770 may include a combination of the HDMI port 771, the component jack 772, the PC port 773, and the USB port 774.

It is understood that the configuration and operations of the inputter/outputter 770 may vary according to various embodiments.

The processor 780 controls overall operations of the display device 700 and a signal flow between the display device 700 and internal components, and performs a function of processing data. When there is a user input or a pre-set and stored (or predetermined) condition is satisfied, the processor 780 may execute an operating system (OS) and various applications stored in the memory 790.

The processor 780 may include RAM storing a signal or data input from the outside of the display device 700 or used as a storage area corresponding to various tasks performed by the display device 700, ROM storing a control program for control of the display device 700, and a processor.

In addition, the processor 780 may include a GPU for graphics processing corresponding to a video. The processor 780 may be implemented as SoC in which a core and the GPU are integrated. The processor 780 may include a single core, a dual core, a triple core, a quad core, or a multiple core.

The processor 780 may include a plurality of processors. For example, the processor 780 may include a main processor and a sub-processor operating in a sleep mode.

The GPU generates a screen including various objects, such as an icon, an image, or text, by using an operator and a renderer. The operator calculates attribute values such as coordinate values, shapes, sizes, and colors of objects to be displayed according to layout of a screen by using a user interaction detected via the detector 760. The renderer generates a screen of various layouts including objects based on the attribute values calculated by the operator. The screen generated by the renderer is displayed within a display area of the display 715.

Figure 8:
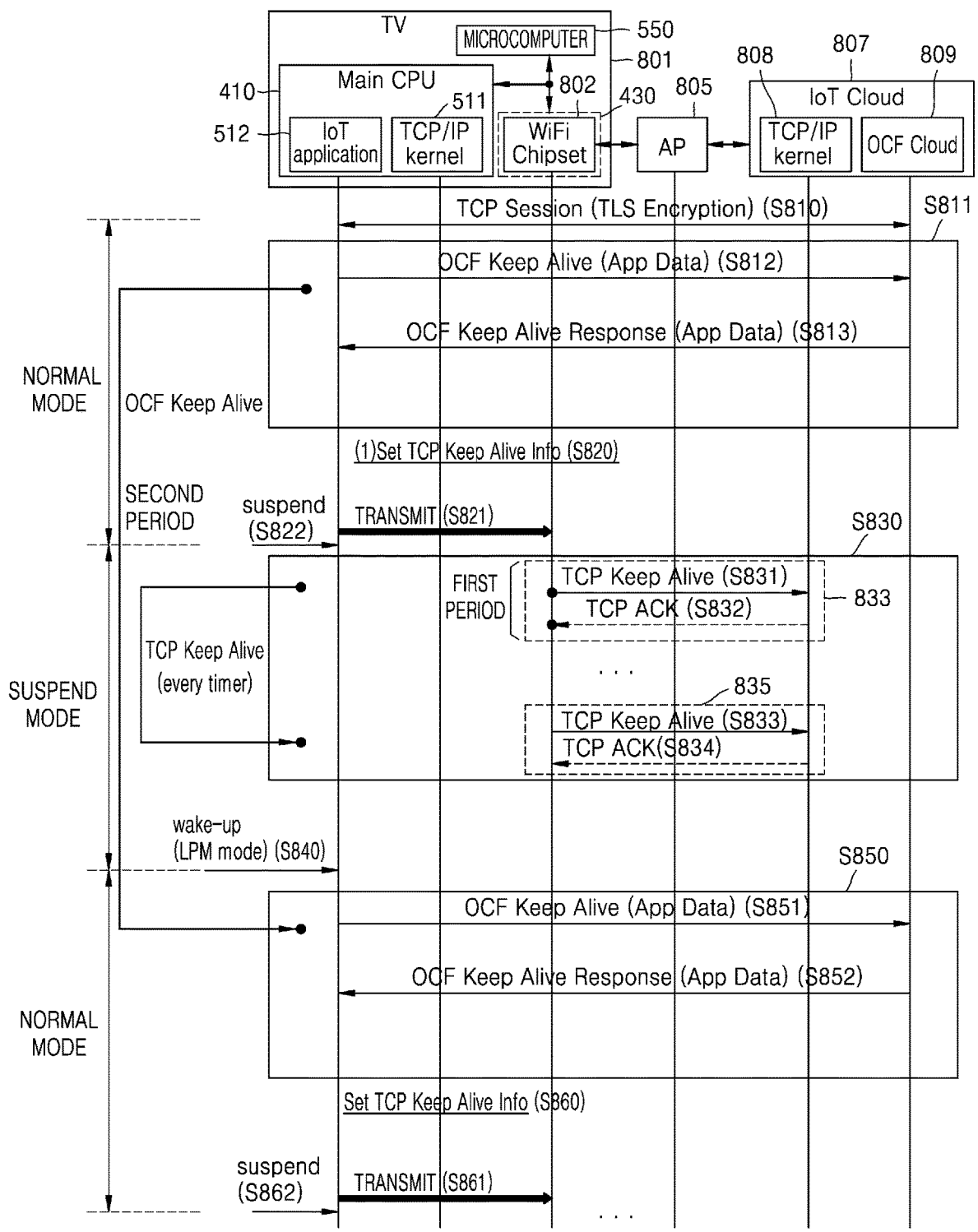
FIG. 8 is a diagram for describing a keep-alive operation performed by a display device, according to an embodiment.

FIG. 8 is a diagram for describing a keep-alive operation performed by a display device 801, according to an embodiment. The keep-alive operation performed by the display device 801 of FIG. 8 will now be described in detail.

The display device 801 of FIG. 8 may correspond to the display devices 160, 301, 400, 500, 600, or 700 described above with reference to FIGS. 1 through 7. In particular, internal components of the display device 801 may be the same as or similar to those of the display device 500 of FIG. 5, and the configuration of the display 420 is not repeated below while illustrating the display device 801. Also, an AP 805 and an IoT cloud server 807 of FIG. 8 may respectively correspond to the AP 230 and the IoT cloud server 210 of FIG. 2. Also, the AP 805 and the IoT cloud server 807 of FIG. 8 may respectively correspond to the AP 230 and the server 305 of FIG. 3. In FIG. 8, the IoT cloud server 807 may simply be referred to as a server 807. While describing operations of the display device 801 of FIG. 8, details overlapping those of FIGS. 1 through 7 may not be repeated below.

Referring to FIG. 8, an example in which the processor 410 of the display device 801 is configured as a main CPU is illustrated. Also, an example in which the communicator 430 of the display device 801 is configured as a Wi-Fi chipset performing communication according to a WLAN communication module is illustrated.

The IoT cloud server 807 is a server supporting an IoT platform and may perform communication according to a TCP/IP protocol and communication according to an OCF standard. In particular, the IoT cloud server 807 may include a TCP/IP kernel 808 and an OCF cloud server 809. Here, the TCP/IP kernel 808 may be a server in charge of transmission and reception of data based on TCP/IP that is an Internet protocol. Also, the OCF cloud server 809 may be a server supporting the IoT platform according to the OCF standard.

The AP 805 includes an NAT device having an NAT function to translate a private IP address to a public IP address such that data transmission and reception is performed between the display device 801 and the IoT cloud server 807.

Referring to FIG. 8, the processor 410 of the display device 801 according to an embodiment may perform TCP session setting (operation S810). Here, the TCP session setting may be performed while the processor 410 is woken up. Here, a TCP session may denote a communication connection between the IoT cloud server 807 and the display device 801 according to TCP. The TCP session setting is to be completed to transmit and receive data according to the TCP/IP protocol. Thus, the display device 801 may complete the TCP session setting before starting a TCP keep-alive operation. The TCP session setting may be performed by using a transmission layer security (TLS) encryption protocol. In particular, data for the TCP session setting may be encrypted according to the TLS encryption protocol and the encrypted data may be transmitted and received between the IoT cloud server 807 and the display device 801 to perform the TCP session setting.

When the TCP session setting is completed, the processor 410 may obtain an access address (for example, an IP address) of the IoT cloud server 807. In particular, the TCP/IP kernel 511 of the processor 410 may obtain the access address (for example, the IP address) of the IoT cloud server 807 and transmit the obtained access address to the communicator 430 (in particular, the Wi-Fi chipset).

An OCF keep-alive operation is a keep-alive operation performed to maintain the TCP session, according to an OCF standard to maintain the IoT platform in an active state. The OCF keep-alive operation period may be performed while the processor 410 is in a normal state, i.e., a wake-up state.

The OCF keep-alive operation is a CoAP message-based application keep-alive operation. Here, the application keep-alive operation may denote a keep-alive operation performed by an application included in the processor 410, for example, the IoT application 512. In the OCF standard, the OCF keep-alive operation may be performed by transmitting and receiving messages (for example, ping/pong messages) exchanged according to a CoAP over TCP specification (RFC 8323). Here, the ping/pong messages may denote messages transmitted and received in operations S812 and S813.

In particular, the OCF keep-alive operation may be performed by the IoT application 512 that is an application included in the processor 410. The IoT application 512 may transmit data transmitted for the OCF keep-alive operation to the IoT cloud server 807 via the AP 805 (operation S812).

The processor 410 may perform the OCF keep-alive operation including operations S812 and S813 in a normal mode or the LPM. In operation S812, the processor 410 may transmit an OCF keep-alive packet to the IoT cloud server 807. Here, the OCF keep-alive packet is a packet including app data and may include a sequence number or acknowledgement (ACK) sequence number of a transmitted or received packet. The app data may include a substantial control command. Next, in operation S813, the IoT cloud server 807 may transmit an OCF keep-alive response packet that is a response notifying that the packet transmitted in operation S812 is normally received to the display device 801 via the AP 805. Here, the OCF keep-alive response packet corresponds to the "first packet" described above and may be finally transmitted to the IoT application 512 of the processor 410.

After the OCF keep-alive operation is performed, the processor 410 may update TCP session information based on the app data included in the OCF keep-alive response packet. In particular, when the OCF keep-alive operation is performed, a sequence number of the transmitted and received packets may be increased. Then, the TCP session information may be generated by reflecting the increased sequence number to the TCP session information obtained in operation S810.

The processor 410 may periodically perform the OCF keep-alive operation every certain (or predetermined) period, for example, 90 seconds.

As described above, the processor 410 may perform the keep-alive operation when an operation mode of the display device 801 is a normal mode or the LPM. In particular, the processor 410 may perform the OCF keep-alive operation in operation S811 to maintain an IoT environment in an active state before the operation mode of the display device 801 is changed to a suspend mode.

According to an embodiment, an operation subject of the OCF keep-alive operation is the processor 410 and an operation subject of the TCP keep-alive operation is the communicator 430. In particular, the IoT application 512 of the processor 410 may be an operation subject of the keep-alive operation (in particular, the OCF keep-alive operation).

Because the OCF keep-alive operation is an operation performed by the IoT application 512 of the processor 410 as the operation subject, a timer corresponding to an operation period of the OCF keep-alive operation may be set to maintain a connection of an application layer instead of a network layer. For convenience of description, when the processor 410 enters the suspend mode upon (or based on) receiving a command requesting to turn off the display device 801, the OCF keep-alive operation may be performed every "second period." In other words, when the command requesting to turn off the display device 801 is received, the processor 410 may wake up every second period and perform the OCF keep-alive operation. Here, a specific time value of the second period may be set by the IoT application 512 of the processor 410. Then, the microcomputer 550 may obtain the second period and drive the timer according to an obtained time value. The microcomputer 550 may wake up the processor 410 based on the timer such that the processor 410 performs the OCF keep-alive operation every second period.

The processor 410 may generate a TCP keep-alive packet for performing the TCP keep-alive operation (operation S820), based on the TCP session information updated after the OCF keep-alive operation is performed in operation S811. In particular, in operation S820, information about the TCP keep-alive packet that is a second packet and a value of the operation period of the TCP keep-alive operation may be generated.

The TCP keep-alive packet may be generated in response to receiving of a command requesting to enter the suspend mode. For example, when the command requesting to turn off the display device 801 is received via a remote controller, the processor 410 may generate the TCP keep-alive packet in response to (or based on) the command. Then, the TCP keep-alive packet may be generated based on the updated TCP session information described above.

Here, the TCP keep-alive operation is a keep-alive operation processed in the network layer instead of the application layer, and is performed by a communication module (for example, a Wi-Fi chipset) that is a TCP kernel stack. The TCP keep-alive packet is data transmitted for the TCP keep-alive operation and may be in a form where payload data is not included.

In particular, the IoT application 512 of the processor 410 may obtain the TCP session information present after the OCF keep-alive operation is performed. Then, the TCP keep-alive information including the TCP keep-alive packet requesting for the TCP keep-alive operation and a value of the operation period of the TCP keep-alive operation may be generated based on the obtained TCP session information. Here, the TCP session information that is the basis for generating the TCP keep-alive packet is current TCP session information updated by reflecting the app data included in an immediately previously received packet, for example, an OCF keep-alive response packet.

The processor 410 may generate the TCP keep-alive packet that has a fixed size and not including payload data, based on the TCP session information.

Here, the TCP session information includes, when a TCP session is set, information about the set TCP session. The TCP session information may include network connection addresses, for example, IP addresses, of the display device 801 and a server (for example, the IoT cloud server 807) connected thereto in a TCP session connection. Accordingly, a source address, a destination address, or the like for performing the TCP keep-alive operation may be obtained from the TCP session information. The TCP keep-alive packet may therefore be generated by using the TCP session information. Also, the TCP session information may include information about a period when the TCP keep-alive operation is performed. Thus, when the TCP session information is obtained, the value of the operation period of the TCP keep-alive operation may be determined.

When TCP keep-alive information is transmitted in operation S821, the processor 410 enters the suspend mode (operation S822). When the processor 410 enters the suspend mode, the communicator 430 may repeatedly perform, as an operation subject, the TCP keep-alive operation every first period as described above.

In particular, after entering the suspend mode, the communicator 430 may transmit the TCP keep-alive packet to the TCP/IP kernel 808 included in the IoT cloud server 807 (operation S831), and receive, from the TCP/IP kernel 808, a TCP ACK packet notifying that the TCP keep-alive packet is normally received (operation S833).

After entering the suspend mode, the communicator 430 may perform the TCP keep-alive operation a plurality of times (operations S833 and S834).

The communicator 430 may perform the TCP keep-alive operation a plurality of times by transmitting the TCP keep-alive packet generated in operation S820 at intervals of the first period and receiving the TCP ACK packet corresponding to the TCP keep-alive packet before the processor 410 is woken up (before operation S840). In particular, the TCP keep-alive packet transmitted in operation S830 does not change before the processor 410 is woken up. The TCP keep-alive packets transmitted when the communicator 430 repeatedly performs the TCP keep-alive operation are the same before the processor 410 is woken up and performs a new OCF keep-alive operation (operation S850). In other words, the TCP keep-alive packet generated in operation S820, which is the same TCP keep-alive packet in operations S831 and S835, may be transmitted to the server 807.

Also, the communicator 430 may determine whether to wake up the processor 410 based on a length of the received TCP ACK packet. In particular, a packet received by the communicator 430 may include a control command based on the IoT platform, which is received from the IoT cloud server 807. The IoT cloud server 807 may receive a request to turn on the display device 801 from an external device of a user (for example, the external device 190 of FIG. 2), generate a control command in response to the request, and transmit the control command to the display device 801. Here, the control command may be a command requesting the display device 801 to be turned on to reproduce a meaningful screen or perform a target function (for example, an image recording function). As described above, when the IoT cloud server 807 generates and transmits the packet including the control command to the display device 801, such a packet is longer than the TCP ACK packet. This is because the TCP ACK packet includes only the data indicating that the TCP keep-alive packet is normally received and does not include payload data, but the packet including the control command needs to include the payload data including the specific content of the control command.

Thus, the communicator 430 may determine whether to wake up the processor 410 by determining (or based on) whether the received packet is the TCP ACK packet or the packet including the control command, based on the length of the received packet.

In particular, the communicator 430 may operate to wake up the processor 410 when the TCP ACK packet includes the payload data and not to wake up the processor 410 when the TCP ACK packet does not include the payload data, based on the length of the received TCP ACK packet.

In other words, an operation of waking up the processor 410 (operation S840) may be performed when a time corresponding to the second period that is an OCF operation period is reached or when (or based on) the packet including the control command is received.

In FIG. 8, an example in which the microcomputer 550 counts the second period and wakes up the processor 410 at the second period is illustrated.

In particular, the processor 410 may enter the suspend mode after performing the OCF keep-alive operation at a first time point (for example, a time point when operation S812 starts), and re-perform the OCF keep-alive operation (operation S850) by being woken up by the microcomputer 550 at a second time point (for example, a time point when operation S851 starts) after the second period has elapsed from the first time point. The communicator 430 may perform the TCP keep-alive operation at least once at intervals of the first period during a time section included between the first time point and the second time point.

Here, the first period may indicate an operation period of the TCP keep-alive operation and the second period may denote an operation period of the OCF keep-alive operation. In particular, the first period may correspond to a transmission interval of the TCP keep-alive packet transmitted to perform the TCP keep-alive operation, and the second period may correspond to a transmission interval of the OCF keep-alive packet transmitted to perform the OCF keep-alive operation.

The first period and the second period may be each set based on a product specification of the AP 805 (for example, a specification of an NAT device included in the AP 805), a product specification of the display device 801, and/or settings of the display device 801. The first period and the second period may each be set by being experimentally optimized. The optimized settings of the first period and the second period are described in detail below with reference to FIGS. 14 and 15.

Referring to FIG. 8, when the processor 410 is woken up, an operation state of the display device 801 is switched from the suspend mode to the LPM, and the processor 410 performs the OCF keep-alive operation (operation S850). Here, because operation S850 is the same as or similar to operation S811, detailed descriptions thereof are not repeated below. Also, after the OCF keep-alive operation is performed (operation S850), TCP keep-alive information is regenerated (operation S860), based on data included in the OCF keep-alive response packet finally received in operation S852 reflecting the performed OCF keep-alive operation, in particular, the app data. In particular, the processor 410 may update the TCP session information based on the app data included in the OCF keep-alive response packet finally received in operation S852, and generate the TCP keep-alive packet based on the updated TCP session information (operation S860). Here, because operation S860 corresponds to operation S820, overlapping descriptions thereof will be not be repeated below.

When the OCF keep-alive operation is performed in operation S850 and the TCP keep-alive information is transmitted in operation S861, the processor 410 enters the suspend mode in operation S862. Here, because operation S862 is the same as or similar operation S822, detailed descriptions thereof are not repeated below.

Figure 9:
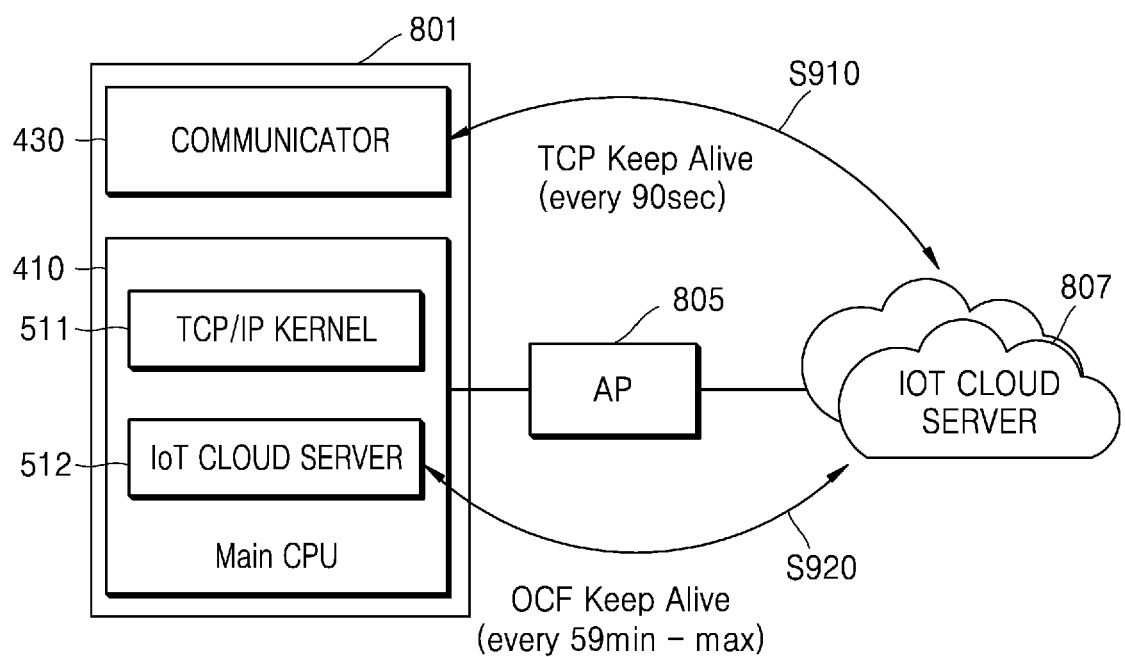
FIG. 9 is a diagram for describing a keep-alive operation according to another embodiment.

FIG. 9 is a diagram for describing a keep-alive operation according to another embodiment.

According to an embodiment, a second period that is an operation period of an OCF keep-alive operation may have a greater value than a first period that is an operation period of a TCP keep-alive operation. For example, the first period may have a value of 90 seconds and the second period may have a value of up to 59 minutes.

Referring to FIG. 9, in the display device 801 according to an embodiment, the processor 410 performs the OCF keep-alive operation at intervals of the second period (for example, up to 59 minutes) (operation S920) and the communicator 430 performs the TCP keep-alive operation at least once at intervals of the first period (for example, 90 seconds) during a time included in the second period (operation S910).

Accordingly, a communication connection to maintain an IoT platform in an active state may be maintained even when the processor 410 is woken up only at intervals of the second period greater than the first period. Thus, the number of times the processor 410 is woken up may be reduced and power consumption to wake up the processor 410 may be reduced. Accordingly, in an embodiment, power consumption occurring in the display device 801 to maintain the IoT platform in the active state may be reduced.

Figure 10:
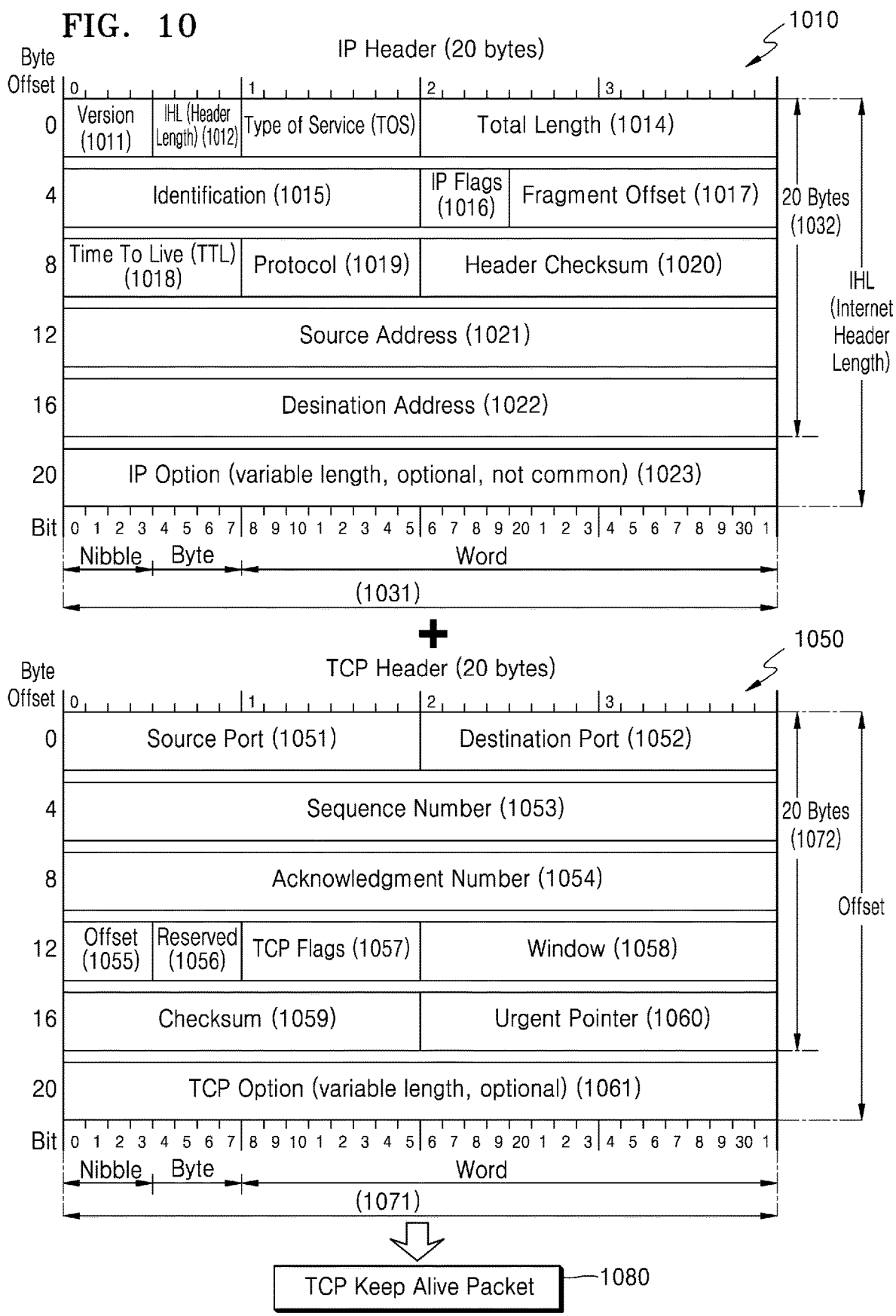
FIG. 10 is a diagram for describing a transmission control protocol (TCP) keep-alive packet generated according to an embodiment.

FIG. 10 is a diagram for describing a TCP keep-alive packet 1080 generated according to an embodiment. Detailed configurations of the display device 801 and IoT cloud server 807 of FIG. 8 will be referred to while describing the TCP keep-alive packet 1080 of FIG. 10.

According to an embodiment, the TCP keep-alive packet 1080 may be configured to have a fixed size and not include payload data. In particular, the TCP keep-alive packet 1080 may be configured to include essential data to perform a TCP keep-alive operation and have a fixed size.

In particular, the TCP keep-alive packet 1080 may include an IP header 1010 having a size of 20 bytes and a TCP header 1050 having a size of 20 bytes, thereby having a size of 40 bytes. The TCP keep-alive packet 1080 may be generated by the processor 410. In particular, the TCP keep-alive packet 1080 may be generated in the IoT application 512.

When power-off of the display device 801 is requested, the processor 410 may obtain information about a last packet of a TCP session in response to the request and generate TCP keep-alive information based on the obtained information.

In particular, when a turn-off (or power-off) event requesting to turn off the display device 801 is generated or identified, the IoT application 512 of the processor 410 may obtain, as TCP session information, information about a packet that is last transmitted and received in a current TCP session from the TCP/IP kernel 511 so as to generate the TCP keep-alive packet 1080. Then, the IoT application 512 may generate the TCP keep-alive packet 1080 based on the TCP session information.

Each of the IP header 1010 and the TCP header 1050 may be divided into four fields. Here, the four fields may include i) a field having a fixed value, ii) a field where information is immediately obtainable after TCP session connection, iii) a field that is to be obtained from the TCP/I P kernel 511 after a last packet of a corresponding TCP session (in particular, a field last transmitted and received in the corresponding TCP session) is transmitted and received, and iv) a checksum field that is to be calculated after an IP/TCP header is finally configured.

First, a configuration of the IP header 1010 is described in detail below.

In the IP header 1010, the field having a fixed value may include the following information:

Version 1011=0x 4
IP header length (IHL) 1012=0x5 (20 bytes)
Total length 1014=0x0028 (40 bytes)
Identification 1015=0x0000
IP flags 1016=0x40
Fragment offset 1017=0x00
Time to live (TTL) 1018=0x40 (64)
Protocol 1019=0x06 (TCP)

Also, in the IP header 1010, the field in which information is immediately obtainable after TCP session connection may include the following information:

Source Address 1021=IP address of display device 801 (in particular, IP address in version 4 (v4))
Destination address 1022=IP address of IoT cloud server 807 (in particular, IP address in v4)

Also, in the IP header 1010, the checksum field to be calculated after the IP header is finally configured may include the following information.

Header checksum 1020

Referring to the IP header 1010 of FIG. 10, the IP header 1010 may have the size of 20 bytes total by being configured of a size of 4 bytes 1031 horizontally and 5 rows 1032 vertically.

Next, a configuration of the TCP header 1050 is described in detail below.

In the TCP header 1050, the field having a fixed value may include the following information:

Offset 1055=0x5
Reserved 1056=0x0
Flags 1057=0x10 (only 5th ACK bit enabled)
Urgent pointer 1060=0x0000

Also, in the TCP header 1050, the field in which information is immediately obtainable after TCP session connection may include the following information:

Source port 1051=TV IoT application process's port number
Destination port 1052=Cloud server's port number (443)

Also, in the TCP header 1050, the field that is to be obtained from the TCP/IP kernel 511 after a last packet of a corresponding TCP session is transmitted and received may include the following information:

Sequence number 1053=set to value obtained by subtracting 1 from sequence number of last packet of current TCP session (TCP keep-alive)
Acknowledgement number 1054=set sequence number that is same as last packet of current TCP session as value of acknowledgement number
Window size 1058 (receive window/(receive window scale<<0x01))

Also, in the TCP header 1050, the checksum field that is to be calculated after the IP header, TCP header, and pseudo header are finally configured may include the following information:

Checksum 1059

Referring to the TCP header 1050 of FIG. 10, the TCP header 1050 may have a total size of 20 bytes by being configured of a size of 4 bytes 1071 horizontally and 5 rows 1072 vertically.

The TCP keep-alive packet 1080 transmitted from the display device 801 to the IoT cloud server 807 via the AP 805 is generated by adding the IP header 1010 and the TCP header 1050 to request for a TCP keep-alive operation.

When the generating of the TCP keep-alive packet 1080 is completed, the processor 410 may transmit the TCP keep-alive packet 1080 and information corresponding to a first period that is an operation period of the TCP keep-alive operation to the communicator 430, in particular, a Wi-Fi chipset 802.

Figure 11:
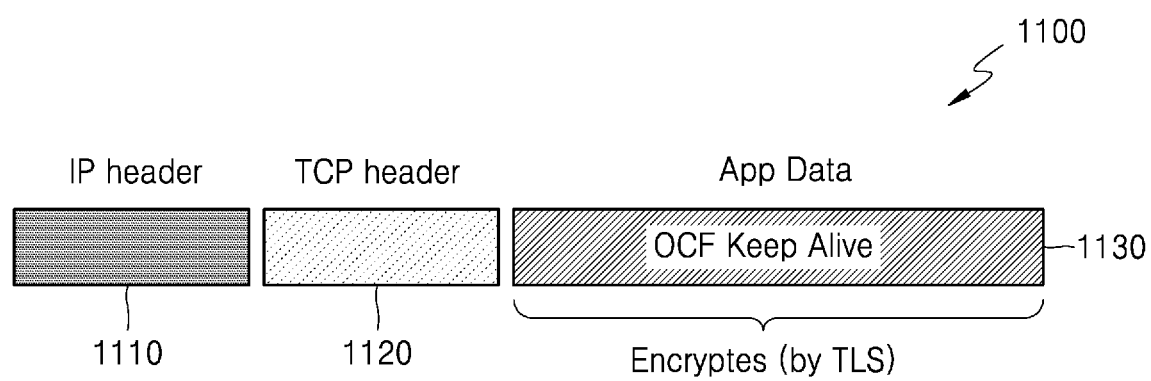
FIG. 11 is a diagram showing an open connectivity foundation (OCF) keep-alive packet used in an OCF keep-alive operation.

FIG. 11 is a diagram showing an OCF keep-alive packet 1100 used in an OCF keep-alive operation.

Figure 12:
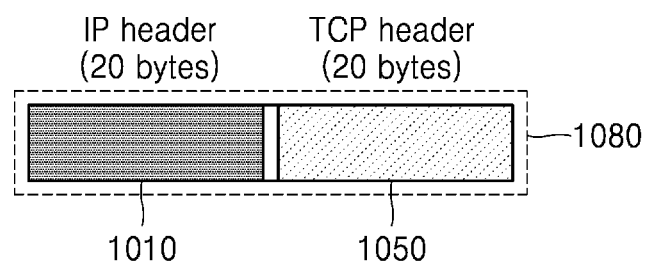
FIG. 12 is a diagram showing a TCP keep-alive packet used in a TCP keep-alive operation.

FIG. 12 is a diagram showing the TCP keep-alive packet 1080 used in a TCP keep-alive operation. In FIG. 12, the same components as in FIG. 10 are illustrated using the same reference numerals.

Referring to FIG. 11, the OCF keep-alive packet 1100 used in the OCF keep-alive operation includes an IP header 1110, a TCP header 1120, and payload data 1130 encrypted by using a TLS encryption protocol. Here, the payload data 1130 may also be referred to as app data 1130. Hereinafter, payload data and app data will both be referred to as app data. Here, app data is data distinguished from a header and may include or be a substantial control command and/or information to be transmitted. Also, regarding packets transmitted and received according to an OCF standard, a sequence number indicating a value of tracking an order of transmitted and received packets, the number of times the packets are transmitted, or a number of transmitted and received packets may be included.

The app data 1130 is to be generated via an operation by which the processor 410 of the display device 801 directly performs encryption and decryption. Thus, a process of transmitting and sharing a security key for encryption and decryption is implemented, and an encryption algorithm also is to be pre-defined and implemented. Then, the app data 1130 is encrypted and decrypted by only using the pre-defined encryption algorithm.

The app data 1130 includes a TCP sequence number and a TCP ACK sequence number of a packet transmitted and received while the OCF keep-alive operation is performed. Accordingly, for the processor 410 to generate the app data 1130, a sequence number included in the app data 1130 needs to be continuously calculated and updated by continuously tracking the sequence number of the transmitted and received packet. In other words, when the OCF keep-alive packet 1100 including the app data 1130 is transmitted and received, the TCP sequence number and TCP ACK sequence number included in the app data 1130 are to be continuously increased.

Thus, to perform the OCF keep-alive operation by using the OCF keep-alive packet 1100, operations in which the processor 410 wakes up to perform encryption and decryption, and continuously updating and generating the app data 1130 are all to be performed. Accordingly, while performing the OCF keep-alive operation, power consumption for wake-up is generated and throughput of the processor 410 increases.

On the other hand, as described above, the TCP keep-alive packet 1080 generated according to an embodiment does not include payload data (or app data) and has a fixed size.

Referring to FIG. 12, the TCP keep-alive packet 1080 includes the IP header 1010 and the TCP header 1050 (e.g., includes only the IP header 1010 and TCP header 1050), and does not include the app data 1130 as in FIG. 11.

Thus, while repeatedly performing the TCP keep-alive operation, the TCP keep-alive packet 1080 is not required to be updated and generated and the TCP keep-alive operation may be performed a plurality of times by repeatedly transmitting the TCP keep-alive packet 1080 that is generated once.

Accordingly, compared to the OCF keep-alive operation, so as to perform the TCP keep-alive operation by using the TCP keep-alive packet 1080, the processor 410 is not required to be woken up and operations of encryption and decryption, and continuously updating and generating the app data 1130 described above are not required to be performed.

Thus, power consumption occurring to wake up the processor 410 may be reduced and throughput generated in the processor 410 and the communicator 430 may be reduced. Accordingly, an IoT environment may maintain an active state with low power, according to an embodiment.

Figure 13:
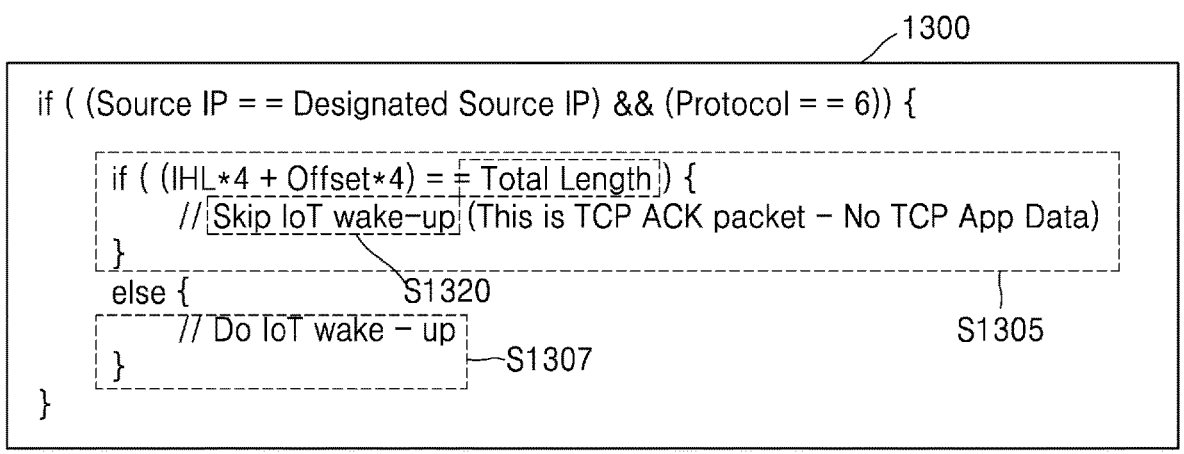
FIG. 13 is a diagram for describing a wake-up operation based on a TCP keep-alive packet, according to an embodiment.

FIG. 13 is a diagram for describing a wake-up operation based on a TCP keep-alive packet, according to an embodiment.

Referring back to FIG. 8, when (or based on) the processor 410 enters the suspend mode (operation S822), the display device 801 disables power supply to components other than the communicator 430 to reduce power consumption. Accordingly, even after entering the suspend mode, the communicator 430 may receive separate power and perform an operation for maintaining a network connection, in particular, a TCP keep-alive operation.

As described above with reference to FIGS. 10 and 12, because the TCP keep-alive packet 1080 does not include app data, data encryption/decryption for TLS is not required to be performed between the display device 801 and the IoT cloud server 807. Also, even when the TCP keep-alive packet 1080 that does not include app data is exchanged, a TCP sequence number and an ACK number do not increase. Thus, the communicator 430, in particular, the Wi-Fi chipset 802, may transmit the TCP keep-alive packet 1080 that is a packet having a fixed size without a configuration for performing a complicated operation (for example, an operation for updating and generating a packet while increasing a TCP sequence number and ACK number).

Also, even when the display device 801 periodically transmits the TCP keep-alive packet 1080 having a fixed size at intervals of a first period, the IoT cloud server 807 considers the received packet as a TCP keep-alive packet having a normal sequence number.

Because the IoT cloud server 807 received the TCP keep-alive packet 1080 having the normal sequence number, the IoT cloud server 807 transmits a TCP ACK packet for the TCP keep-alive packet 1080 according to a TCP as described with reference to operation S832. Accordingly, the display device 801 may receive the TCP ACK packet from the IoT cloud server 807 in response to the TCP keep-alive packet 1080.

The communicator 430 may then determine whether the TCP ACK packet is a packet requesting wake-up or a simple TCP ACK packet received in response to transmission of the TCP keep-alive packet 1080.

In particular, the communicator 430 may verify whether the received packet is a pure TCP ACK packet not including payload data, and determine whether to wake up the processor 410 accordingly.

In particular, information about the following five fields is provided for the communicator 430 to determine whether the receive packet is the TCP ACK packet.

[Information in IP Header]

Has a length of IP header length (IHL) 4 bits and is a number of 32 bit words. A smallest value is 5 and 4 is multiplied to obtain a byte count.

Total length (16-bits): Total size of packet including IP/TCP header and data

Protocol (8-bits): TCP=0x06

Source address (32-bits): Designated cloud server's IPv4 address

[Information in TCP Header]

Offset (4-bits): Size of TCP header in 32 bit words is described and smallest value is 5.4 is multiplied to obtain a byte count.

Referring to FIG. 13, it is determined whether the received packet is the TCP ACK packet (operation S1305) based on the information about the five fields via a logic 1300, and wake-up may be skipped (operation S1320) when the received packet is the TCP ACK packet. When the received packet is not the TCP ACK packet, a wake-up operation may be performed (operation S1307). In particular, when the received packet is not the TCP ACK packet, it may be determined that the received packet is a packet requesting a specific operation (for example, turn-on of the display device 801) and the processor 410 may be woken up (operation S1307).

In particular, when (or based on) it is determined that the received packet is not the TCP ACK packet, the communicator 430 performs a wake-up operation on the processor 410. Then, the processor 410 is woken up and decodes app data included in the received packet to perform a corresponding operation. For example, when the received packet is a packet requesting to turn on the display device 801, the processor 410 switches from the LPM to a complete normal mode and may control the display 420 to output a meaningful screen instead of a black screen.

Also, when a packet including app data is received, the processor 410 may regenerate a TCP keep-alive packet by increasing a TCP sequence number and an ACK number and transmit the regenerated TCP keep-alive packet to the communicator 430.

Hereinafter, an operation of optimizing and setting a first period that is an operation period of a TCP keep-alive operation and a second period that is an operation period of an OCF keep-alive operation are described below with reference to FIGS. 14 and 15.

According to an embodiment, the processor 410 may set a value of the first period based on a binding lifetime of the AP 805 accessed to be connected to the IoT cloud server 807. In particular, the processor 410 may flexibly set the value of the first period that is the operation period of the TCP keep-alive operation by searching for a value of the binding lifetime that is a "lifetime of a NAT binding table entry." For example, according to an embodiment, the display device 801 transmits and receives an NAT check request/response message to and from the IoT cloud server 807, and may search for the value of the binding lifetime of the AP 805 of FIG. 8 that is currently connected. Thus, by performing a keep-alive operation by finding the value of the first period that is the optimum operation period of the TCP keep-alive operation, a load of the IoT cloud server 807 may be reduced.

Figure 14:
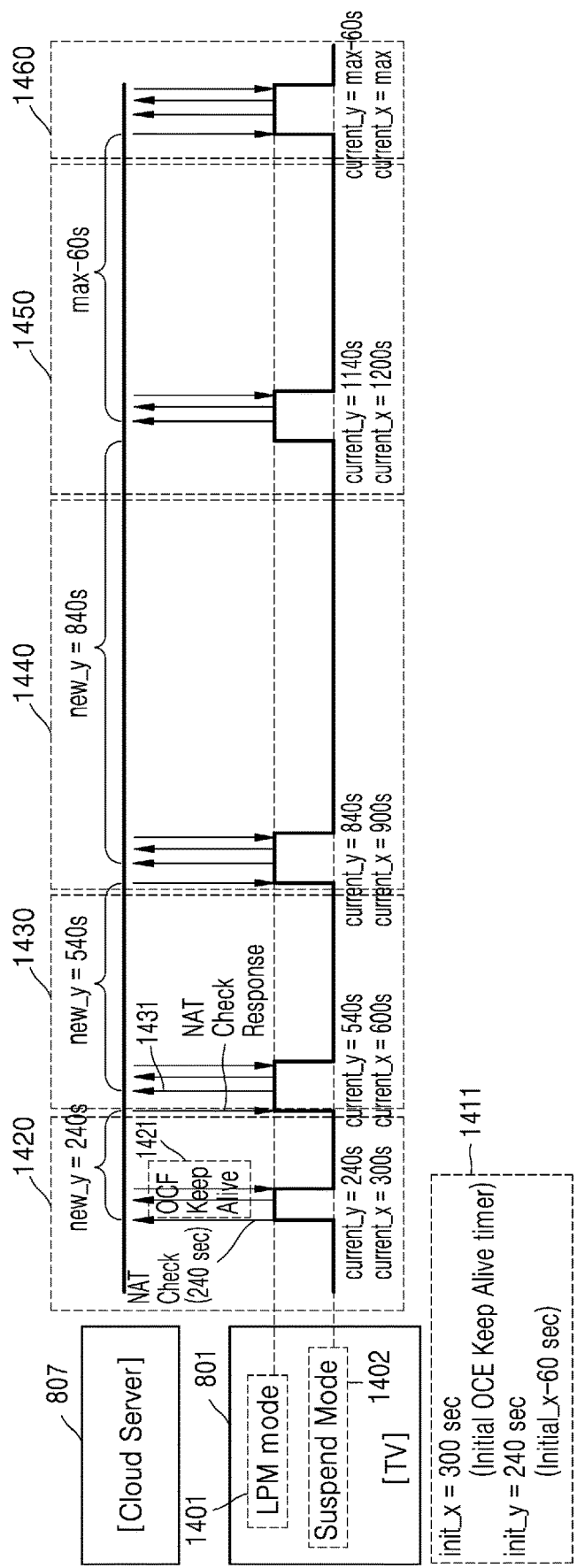
FIG. 14 is a diagram for describing a setting operation of a keep-alive period, according to an embodiment.

FIG. 14 is a diagram for describing a setting operation of a keep-alive period, according to an embodiment. Hereinafter, operations for setting an operation cycle of a TCP keep-alive operation are described in detail with reference to FIGS. 8 through 14.

First, a value of a binding lifetime may be greater than a largest period of an OCF keep-alive operation. In this case, the processor 410, in particular, the IoT application 512, may sequentially perform the following operations to set an operation period of a TCP keep-alive operation.

Operation 1: As indicated by a block 1411, an initial OCF keep-alive period value (init_x, for example, 300 seconds) and a NAT check time (int_y, for example, 240 seconds) are set. The NAT check time should be smaller than the initial OCF keep-alive period value.

Operation 2: When a turn-off event for the display device 801 occurs, the IoT application 512 generates an NAT check request message including a value of the NAT check time.

Operation 3: Continuously, when the display device 801 is turned off and is in a suspend mode, the IoT cloud server 807 transmits, to the display device 801, an NAT check response message according to the value of the NAT check time received in operation 2.

Operation 4: Upon receiving the NAT check response message, the display device 801 is woken up in the LPM according to a source IP filtering operation. Then, the IoT application 512 determines whether the waking up is based on the NAT check response message or a command remotely requesting turn-on.

Operation 5: When the waking up is based on the NAT check response message, it is determined that the value of binding lifetime is greater than the NAT check time set in operation 2, and thus the value of the NAT check time is increased, the NAT check request message is transmitted again and the display device 801 is switched to the suspend mode. The value of NAT check time may be calculated by using Equation 1 below.

New NAT Check Time=(Current NAT Check Time+ Initial NAT Check Time)−x(Second)  [Equation 1]

Here, x should be smaller than an operation period of the OCF keep-alive operation.

Operation 6: When the value of the NAT check time becomes greater than a largest value (for example, 1 hour) of the operation period of the OCF keep-alive operation, the value of the binding lifetime is set to be greater than the operation period of the OCF keep-alive operation. Thus, only the OCF keep-alive operation may be performed without performing the TCP keep-alive operation by setting a largest value for a second period that is an operation period of the OCF keep-alive operation.

Referring to FIG. 14, when the processor 410 is woken up, the display device 801 may set the initial OCF keep-alive period value (init_x, for example, 300 seconds) and the NAT check time (int_y, for example, 240 seconds) as in the block 1411. Next, the display device 801 may transmit, to the IoT cloud server 807, an NAT check request message (indicated as 'NAT check' in FIG. 14) including the set value of NAT check time in the LPM.

Referring to a block 1420, the display device 801 may perform an OCF keep-alive operation 1421 in the LPM. When the processor 410 completes the OCF keep-alive operation 1421, the display device 801 enters a suspend mode 1402.

As shown in the example of the block 1420, after the NAT check request message is transmitted, the display device 801 may receive an NAT check response message (indicated as "NAT check response" in FIG. 14) within the set NAT check time (int_y, for example, 240 seconds).

Referring to a block 1430, as described above with reference to operation 4, the processor 410 is woken up to the LPM according to the source IP filtering operation. Then, the IoT application 512 determines whether the waking up is based on the NAT check response message or based on a command remotely requesting turn-on.

When the waking up is based on the NAT check response message, it is determined that the value of binding lifetime is greater than the NAT check time set in operation 2. Thus, the value of the NAT check time is increased, the NAT check request message is transmitted again and the display device 801 is switched to the suspend mode. In other words, as indicated by a block 1430, an updated NAT check time (current y, for example, 540 seconds) is set, an NAT check request message 1431 is transmitted again, and the display device 801 is switched to the suspend mode.

Operations 1 through 5 described above are repeatedly performed, and when the value of NAT check time becomes greater than the largest value (for example, 1 hour) of the operation period of the OCF keep-alive operation, only the OCF keep-alive operation may be performed without performing the TCP keep-alive operation by setting the largest value for the second period that is the operation period of the OCF keep-alive operation.

Hereinafter, an operation of setting an operation period of a TCP keep-alive operation when a time value of a binding lifetime is smaller than a largest period of an OCF keep-alive operation is described in detail below.

Figure 15:
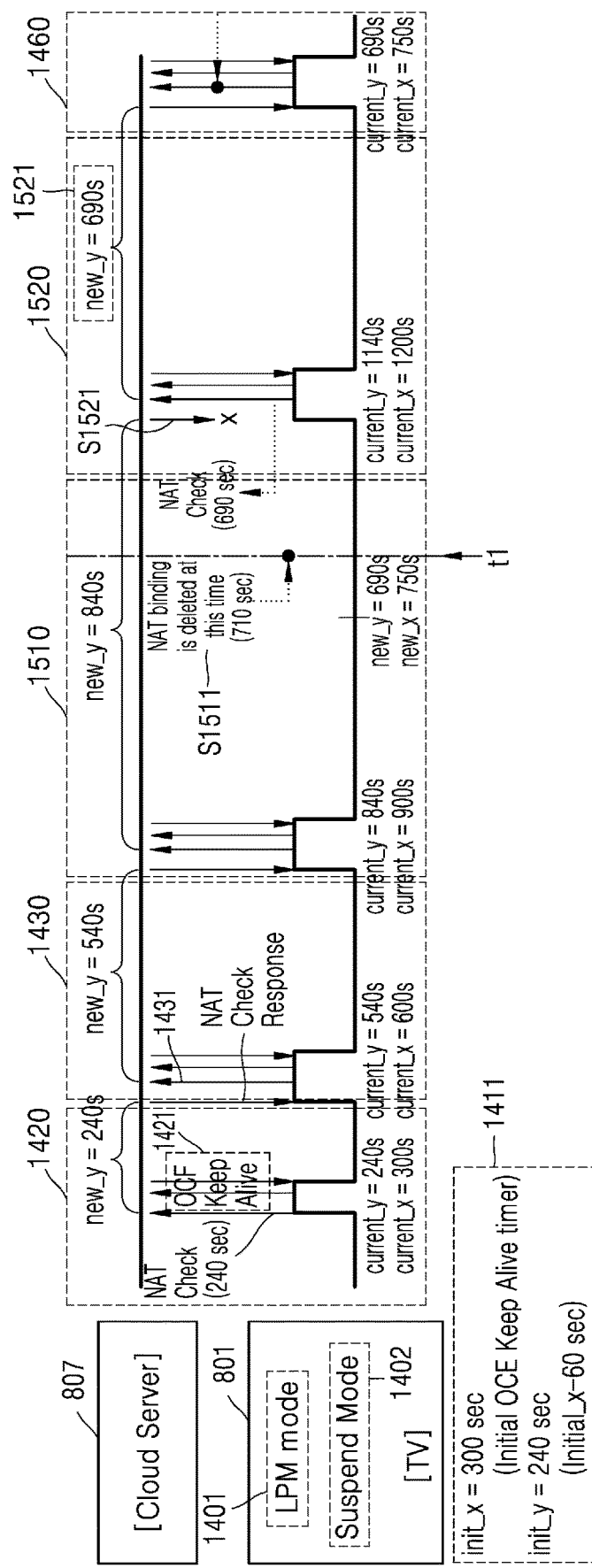
FIG. 15 is a diagram for describing a setting operation of a keep-alive period, according to another embodiment.

FIG. 15 is a diagram for describing a setting operation of a keep-alive period, according to another embodiment.

When a time value of a binding lifetime is smaller than a largest period of an OCF keep-alive operation, operations 1 through 4 described above are sequentially performed to set an operation period of a TCP keep-alive operation. Then, operations 5-1 through 7-1 may be performed continuously.

Operation 5-1: Referring to a block 1510, when waking up occurs based on a turn-on command that is remotely received instead of reception of an NAT check response message, an entry in an NAT binding table is deleted as described above with reference to the NAT binding table 355 of FIG. 3. Then, it may be determined that transmission of an NAT check response message corresponding to inbound traffic has failed (operation S1521). In this case, a new NAT check time value may be set as in Equation 2 below to find a binding lifetime of NAT based on binary search:

$$\text{New NAT Check Time} = \text{Previous NAT Check Time} - ((\text{Current NAT Check Time} - \text{Previous NAT Check Time})/2) \quad \text{[Equation 2]}$$

In particular, the NAT check time may be updated from 840 seconds to 690 seconds by performing operation 5-1.

Operation 6-1: Referring to a block 1520, when (or based on) the NAT check response message is received within the NAT check time value newly set in operation 5-1, the current NAT check time value may be set to a value of a first period that is an operation period of the TCP keep-alive operation. When (or based on) the NAT check response message is not received, the NAT check time value is re-searched for by repeating operation 5-1.

Operation 7-1: When the NAT check time value is smaller than the largest period of the OCF keep-alive operation, the communicator 430 may periodically perform the TCP keep-alive operation according to the operation period of the TCP keep-alive operation set in operation 6-1 and set a largest value for the operation period of the OCF keep-alive operation.

In the example of FIG. 15, as shown in the block 1520, when the NAT check time is updated to 690 seconds and the NAT check response message is received at the updated NAT check time (when condition described in operation 6-1 is satisfied), the current NAT check time value may be set to the value of the first period that is the operation period of the TCP keep-alive operation. In other words, as shown in the block 1460, the TCP keep-alive operation may be repeatedly performed by setting 690 seconds as the value of the first period.

In other words, the processor 410 may search for the binding lifetime by repeatedly performing operations of transmitting the NAT check request message including the NAT check time value to the IoT cloud server 807 and receiving the NAT check response message in response, thereby setting the value of the first period that is the operation period of the TCP keep-alive operation.

Figure 16:
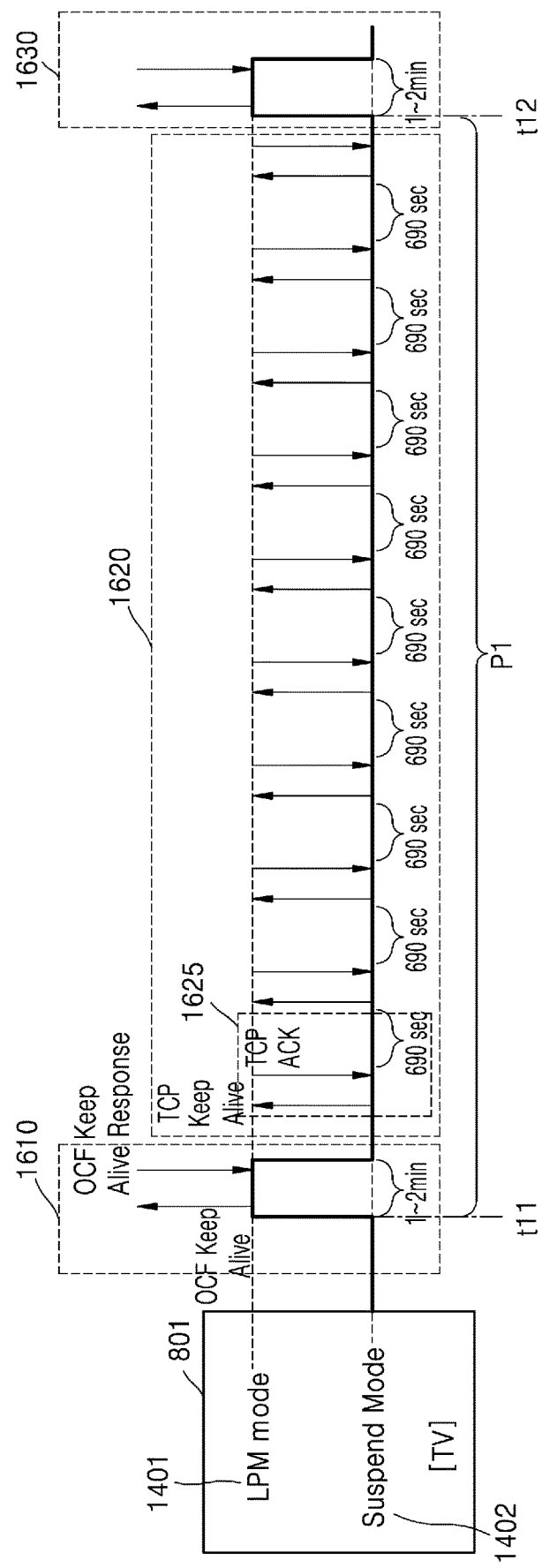
FIG. 16 is a diagram for describing a keep-alive operation according to another embodiment.

FIG. 16 is a diagram for describing a keep-alive operation according to another embodiment. In FIG. 16, the same components as in FIG. 14 are illustrated using the same reference numerals.

Referring to FIG. 16, according to an embodiment, the display device 801 enters the suspend mode 1402 after performing an OCF keep-alive operation in LPM 1401 as in a block 1610.

Then, after the display device 801 enters the suspend mode 1402, a TCP keep-alive operation 1625 may be performed at least once at intervals of a first period (for example, 690 seconds) as in a block 1620.

Also, the OCF keep-alive operation may be performed again as in a block 1630 after the first period that is a largest operation period P1 (a time section between a time t11 and a time t12) of the OCF keep-alive operation.

Figure 17:
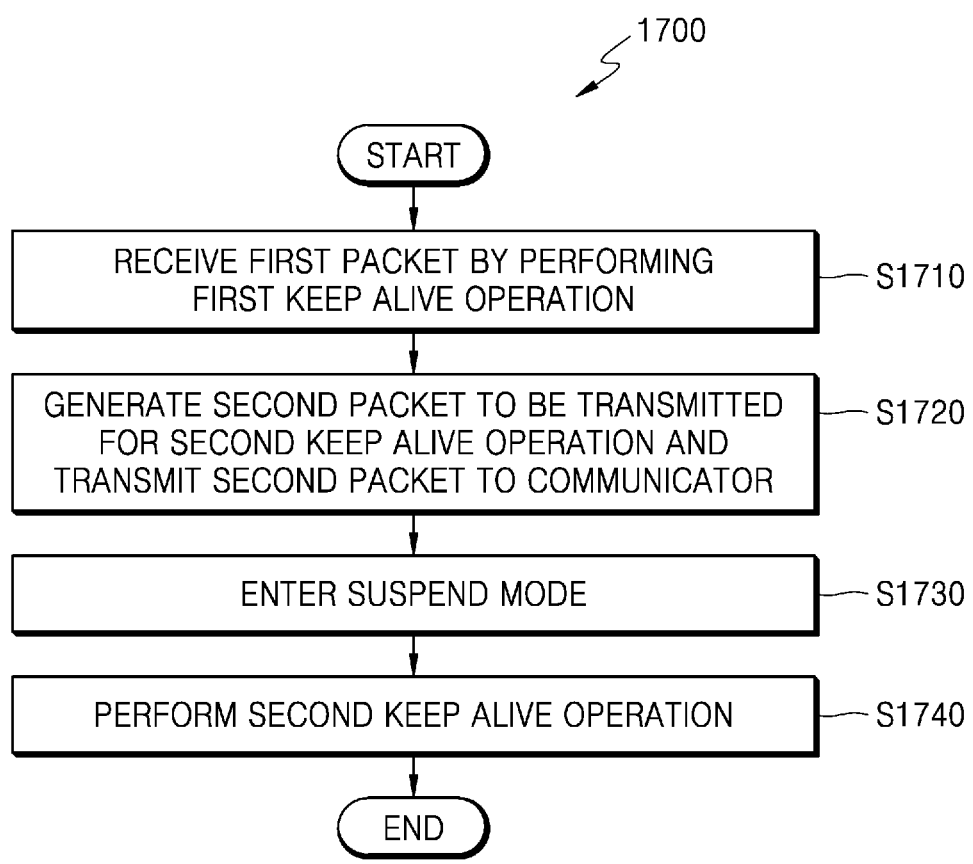
FIG. 17 is a flowchart of an operating method of a display device, according to an embodiment.

FIG. 17 is a flowchart of an operating method 1700 of a display device, according to an embodiment. FIG. 17 may be a flowchart for describing operations performed in the display device 160, 301, 400, 500, 600, 700, or 801 according to various embodiments described above with reference to FIGS. 1 through 16. Accordingly, the operating method 1700 according to an embodiment may be performed via the display device 160, 301, 400, 500, 600, 700, or 801 according to various embodiments described above with reference to FIGS. 1 through 16. Thus, the operating method 1700 may include the same or similar structural features as the display device 160, 301, 400, 500, 600, 700, or 801 described above.

Thus, descriptions of the operating method 1700, which overlap those of FIGS. 1 and 16, may not be repeated below.

Hereinafter, the operating method 1700 is described in detail below with reference to the display device 400 of FIG. 4.

According to an embodiment, the operating method 1700 is an operating method of the display device 400 including the display 420, the communicator 430 performing communication with a server, for example, an IoT cloud server, via at least one wireless network, and the processor 410 performing at least one instruction.

Referring to FIG. 17, in the operating method 1700, the processor 410 receives a first packet from the server by communicating with an OCF cloud server included in the server to perform an OCF keep-alive operation (operation S1710).

Then, the processor generates a second packet for performing a second keep-alive operation according to a second communication protocol with the server, based on data included in the received first packet, and transmits the second packet to the communicator 430 (operation S1720).

After operation S1720, the processor 410 enters a suspend mode (operation S1730).

After entering the suspend mode, the communicator 430 performs the second keep-alive operation by transmitting the second packet at intervals of a first period (operation S1740).

An operating method of a display device, according to an embodiment, may be recorded on a computer-readable recording medium by being implemented in a form of program commands executed by using various computers. Further, one or more programs including instructions for executing an operating method of a display device, according to an embodiment, may be recorded on a computer-readable recording medium.

The computer-readable recording medium may include at least one of a program command, a data file, or a data structure. The program commands recorded in the computer-readable recording medium may be specially designed or well known to one of ordinary skill in the computer software field. Examples of the computer-readable recording medium include magnetic media such as hard disks, floppy disks, and magnetic tapes, optical media such as CD-ROMs and DVDs, magneto-optical media such as floptical disks, and hardware devices specially configured to store and perform program commands, such as read-only memory (ROM), random-access memory (RAM), and flash memory. Examples of the computer command include mechanical codes prepared by a compiler, and high-level languages executable by a computer by using an interpreter.

A display device and an operating method thereof according to embodiments may reduce power consumption occurring while implementing an IoT environment.

In particular, a display device and an operating method thereof according to embodiments may reduce power consumption occurring to perform a keep-alive operation while implementing an IoT environment.

While embodiments have been particularly shown and described in detail, it will be understood by one of ordinary skill in the art that various changes in form and details may be made therein without departing from the spirit and scope of the disclosure as defined at least by the following claims.

What is claimed is:

1. A display device comprising:
a display;
a communicator configured to perform communication with a server via at least one wireless network; and
a processor configured to execute at least one instruction to:
while the display device is in a normal mode, perform a first keep-alive operation according to a first communication protocol by transmitting a first packet to the server and receiving a first response from the server,
generate and transmit, to the communicator, a second packet, which is different from the first packet, for performing a second keep-alive operation according to a second communication protocol with the server, based on data included in the received first response packet, and
control the display device to enter a suspend mode after transmitting the second packet,
wherein the communicator is further configured to, while the display device is in the suspend mode, perform the second keep-alive operation according to the second communication protocol, which is different from the first communication protocol, by transmitting the second packet, which is different from the first packet, to the server at intervals of a first period.

2. The display device of claim 1, wherein the processor is further configured to execute the at least one instruction to:
update transmission control protocol (TCP) session information, based on the data included in the received first response packet; and
generate the second packet, based on the updated TCP session information, in response to an input or an event to enter the suspend mode being received or determined.

3. The display device of claim 2, wherein the processor is further configured to execute the at least one instruction to generate a TCP keep-alive packet that is the second packet of a fixed size not including payload data, based on the updated TCP session information.

4. The display device of claim 1, wherein the processor is further configured to execute the at least one instruction to transmit, to the server, an open connectivity foundation (OCF) keep-alive packet as the first packet according to an OCF communication protocol, and perform the first keep-alive operation based on receiving, from the server, the first response packet corresponding to the OCF keep-alive packet.

5. The display device of claim 1, wherein:
the first communication protocol is an OCF communication protocol;
the second communication protocol is a transmission control protocol/Internet protocol (TCP/IP) communication protocol;
the server is an Internet of Things (IoT) cloud server including an OCF cloud server;
the first keep-alive operation is an OCF keep-alive operation; and
the second keep-alive operation is a TCP keep-alive operation.

6. The display device of claim 5, further comprising:
a microcomputer configured to wake up the processor every second period by storing timing information about the second period in which the first keep-alive operation is performed,
wherein the processor is further configured to execute the at least one instruction to:
enter the suspend mode after performing the OCF keep-alive operation at a first time point,
receive a new first response packet from the server by re-performing the OCF keep-alive operation by being woken up by the microcomputer, at a second time point after the second period is elapsed from the first time point, and
generate a new second packet, based on data included in the new first response packet.

7. The display device of claim 1, wherein:
the communicator is further configured to perform a TCP keep-alive operation that is the second keep-alive operation at the intervals of the first period; and
the processor is further configured to execute the at least one instruction to perform an OCF keep-alive operation that is the first keep-alive operation by being woken up every second period greater than the first period.

8. The display device of claim 1, wherein the communicator is further configured to transmit a TCP keep-alive packet that is the second packet to a TCP/IP kernel included in the server while the display device is in the suspend mode, and perform a TCP keep-alive operation that is the second keep-alive operation based on receiving, from the TCP/IP kernel, a TCP acknowledgement (ACK) packet indicating that the TCP keep-alive packet is normally received.

9. The display device of claim 8, wherein the communicator is further configured to determine whether to wake up the processor, based on a length of the received TCP ACK packet.

10. The display device of claim 9, wherein the communicator is further configured to wake up the processor based on payload data being included in the TCP ACK packet, determined according to the length of the received TCP ACK packet, and to not wake up the processor based on the payload data not being included in the TCP ACK packet.

11. The display device of claim 1, wherein the second packet is a TCP keep-alive packet having a size of 40 bytes and including an Internet protocol (IP) header of a size of 20 bytes and a TCP header of a size of 20 bytes.

12. The display device of claim 1, wherein the processor is further configured to execute the at least one instruction to set a value of the first period, based on a lifetime corresponding to the display device, which is included in a network address translation (NAT) binding table of an access point (AP) accessed to connect to the server.

13. The display device of claim 12, wherein the processor is further configured to execute the at least one instruction to set a time value of the first period by repeatedly performing an operation of transmitting, to the server, a NAT check request message including a NAT check time value and receiving a NAT check response message in response to a search for the lifetime.

14. The display device of claim 1, wherein the data is application data generated based on an open connectivity foundation (OCF) communication protocol.

15. An operating method of a display device comprising a display, a communicator configured to perform communication with a server via at least one wireless network, and a processor configured to execute at least one instruction, the operating method comprising:
while the display device is in a normal mode, by the processor, performing a first keep-alive operation according to a first communication protocol by transmitting a first packet to the server and receiving a first response packet from the server;
generating and transmitting, by the processor to the communicator, a second packet for performing a second keep-alive operation according to a second communication protocol with the server, based on data included in the received first packet;
controlling the display device to enter a suspend mode after the transmitting of the second packet; and
while the display device is in the suspend mode, performing, by the communicator, the second keep-alive operation according to the second communication protocol, which is different from the first communication protocol, by transmitting the second packet, which is different from the first packet, to the server at intervals of a first period.

16. The operating method of claim 15, wherein the generating and transmitting comprises:
updating transmission control protocol (TCP) session information, based on the data included in the received first response packet; and
generating the second packet, based on the updated TCP session information, in response to an input or an event to enter the suspend mode being received or determined.

17. The operating method of claim 15, wherein the receiving comprises transmitting, to the server, an open connectivity foundation (OCF) keep-alive packet as the first packet according to an OCF communication protocol, and performing the first keep-alive operation based on receiving, from the server, the first response packet corresponding to the OCF keep-alive packet.

18. The operating method of claim 17, wherein the performing the first keep-alive operation comprises performing an OCF keep-alive operation that is the first keep-alive operation by being woken up every second period greater than the first period.

19. The operating method of claim 18, wherein the second packet is a TCP keep-alive packet of a fixed size not including payload data.

20. The operating method of claim 15, wherein:
the first communication protocol is an OCF communication protocol;
the second communication protocol is a transmission control protocol/Internet protocol (TCP/IP) communication protocol;
the server is an Internet of Things (IoT) cloud server including an OCF cloud server;
the first keep-alive operation is an OCF keep-alive operation; and
the second keep-alive operation is a TCP keep-alive operation.

21. A non-transitory computer-readable recording medium having recorded thereon at least one instruction executable by a processor of an electronic device to perform a method comprising:
while the display device is in a normal mode, by the processor, performing a first keep-alive operation according to a first communication protocol by transmitting a first packet to the server and receiving a first response packet from a server;
generating and transmitting, by the processor to a communicator of the electronic device, a second packet, which is different from the first packet, for performing a second keep-alive operation according to a second communication protocol with the server, based on data included in the received first response packet;
controlling the electronic device to enter a suspend mode after the transmitting of the second packet; and
while the electronic device is in the suspend mode, performing, by the communicator, the second keep-alive operation according to the second communication protocol, which is different from the first communication protocol, by transmitting the second packet, which is different from the first packet, to the server at intervals of a first period.

22. An electronic device comprising:
a communicator configured to perform communication with a server via at least one wireless network; and
a processor configured to execute at least one instruction to:
while the display device is in a normal mode, perform a first keep-alive operation according to a first communication protocol by transmitting a first packet to the server and receiving a first response packet from the server,
generate and transmit, to the communicator, a second packet, which is different from the first packet, for performing a second keep-alive operation according to a second communication protocol with the server, based on data included in the received first response packet, and
control the electronic device to enter a suspend mode after transmitting the second packet,
wherein the communicator is further configured to, while the electronic device is in the suspend mode, perform the second keep-alive operation according to the second communication protocol, which is different from the first communication protocol, by transmitting the second packet, which is different from the first packet, to the server at intervals of a first period.

* * * * *